United States Patent
Ohkawa

(10) Patent No.: US 8,647,416 B2
(45) Date of Patent: Feb. 11, 2014

(54) SUPERHEATED STEAM GENERATOR, ELECTRIC POWER GENERATING SHIP, AND CONNECTION ROBOT

(76) Inventor: Tokio Ohkawa, Tokyo (JP)

(*) Notice: Subject to any disclaimer, the term of this patent is extended or adjusted under 35 U.S.C. 154(b) by 727 days.

(21) Appl. No.: 12/995,270

(22) PCT Filed: Oct. 14, 2009

(86) PCT No.: PCT/JP2009/067796
§ 371 (c)(1),
(2), (4) Date: Nov. 30, 2010

(87) PCT Pub. No.: WO2010/044427
PCT Pub. Date: Apr. 22, 2010

(65) Prior Publication Data
US 2011/0139146 A1 Jun. 16, 2011

(30) Foreign Application Priority Data
Oct. 16, 2008 (JP) .................. 2008-289236

(51) Int. Cl.
*B01D 53/02* (2006.01)
(52) U.S. Cl.
USPC .......... 96/108; 95/117; 126/263.05; 126/609; 901/2
(58) Field of Classification Search
USPC ....... 95/117; 96/108; 126/263.05, 609; 901/2
See application file for complete search history.

(56) References Cited

U.S. PATENT DOCUMENTS

| 2010/0031528 A1* | 2/2010 | Akkerman et al. ............. 34/472 |
| 2011/0041783 A1* | 2/2011 | Bruckner ...................... 122/7 R |

FOREIGN PATENT DOCUMENTS

| JP | 62-36898 U | 3/1987 |
| JP | 9-103670 A | 4/1997 |
| JP | 10-89799 A | 4/1998 |
| JP | 2001-263952 A | 9/2001 |
| JP | 3094574 U | 6/2003 |

OTHER PUBLICATIONS

International Search Report dated Jan. 12, 2010 from corresponding International Application No. PCT/JP2009/067796 (Form PCT/ISA/210).
Written Opinion of the international Searching Authority dated Jan. 12, 2010 from corresponding International Application No. PCT/JP2009/067796 (Form PCT/ISA/237).

(Continued)

*Primary Examiner* — Christopher P Jones
(74) *Attorney, Agent, or Firm* — Young Basile Hanlon & MacFarlane P.C.

(57) ABSTRACT

A superheated steam generator for generating superheated steam is disclosed that can be converted into electric energy by adsorbing water into zeolite and desorbing water from zeolite by use of solar heat source energy and seawater source energy. The superheated steam generator using zeolite is provided with a water supply device for causing the zeolite to adsorb mist-state moisture and heat the zeolite, a zeolite boiler system including a desorption heater for desorbing water molecules adsorbed onto the zeolite and heating the zeolite to produce the superheated steam, a low-temperature purified water tank for storing purified water that can be subjected to heat exchange with at least one of seawater and surface water, and for supplying purified water energy subsequent to the heat exchange to the water supply device, and an atomization device for generating the purified water supplied to the water supply device as the mist-state moisture.

9 Claims, 12 Drawing Sheets

(56) References Cited

OTHER PUBLICATIONS

Notification of Transmittal of Translation of the International Preliminary Report on Patentability (Form PCT/IB/338), International Preliminary Report on Patentability (Form PCT/IB/373) and Written Opinion of the International Searching Authority (Form PCT/ISA/237), mailed May 26, 2011 for the corresponding International Application No. PCT/JP2009/067796.

* cited by examiner

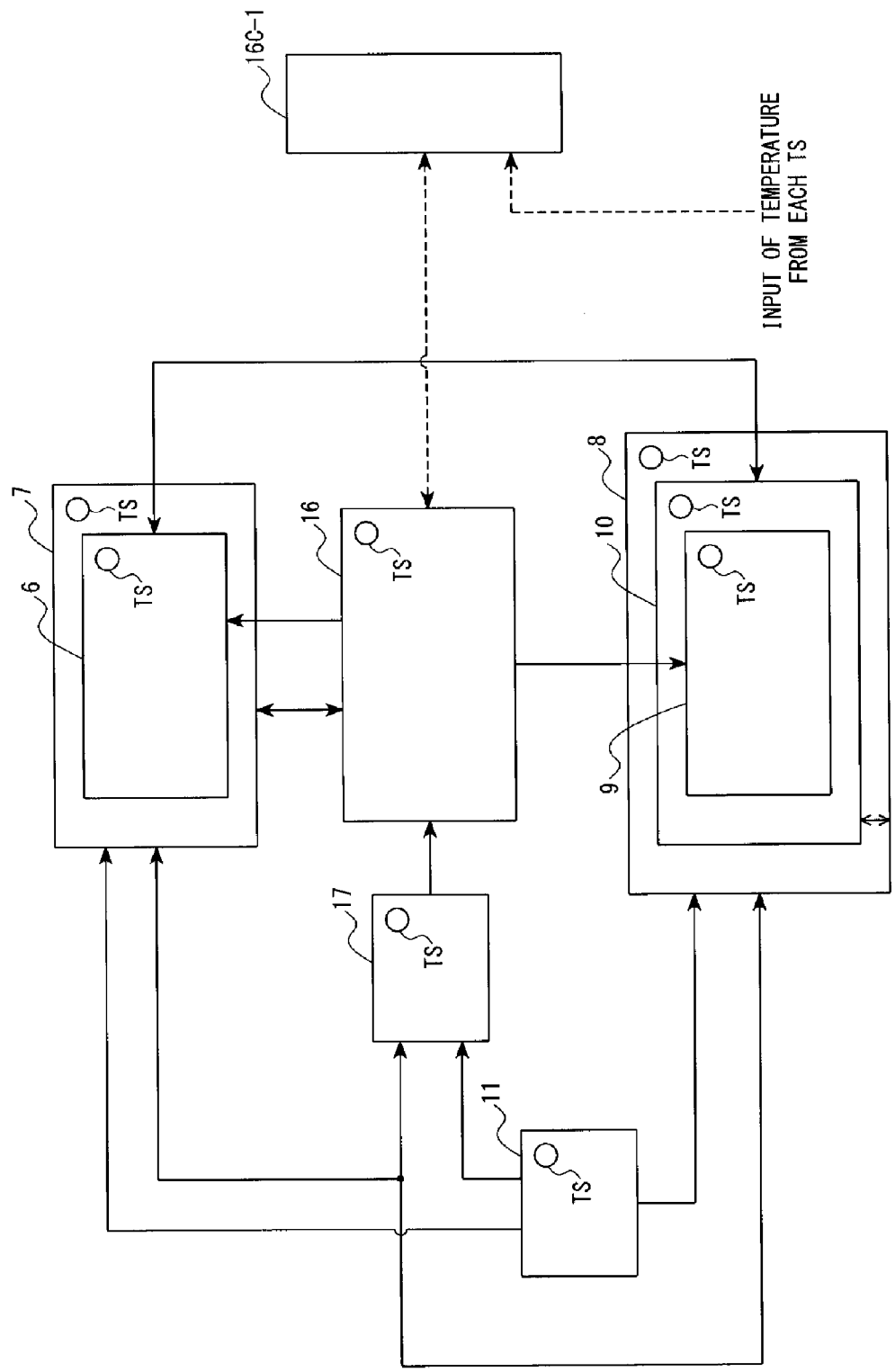

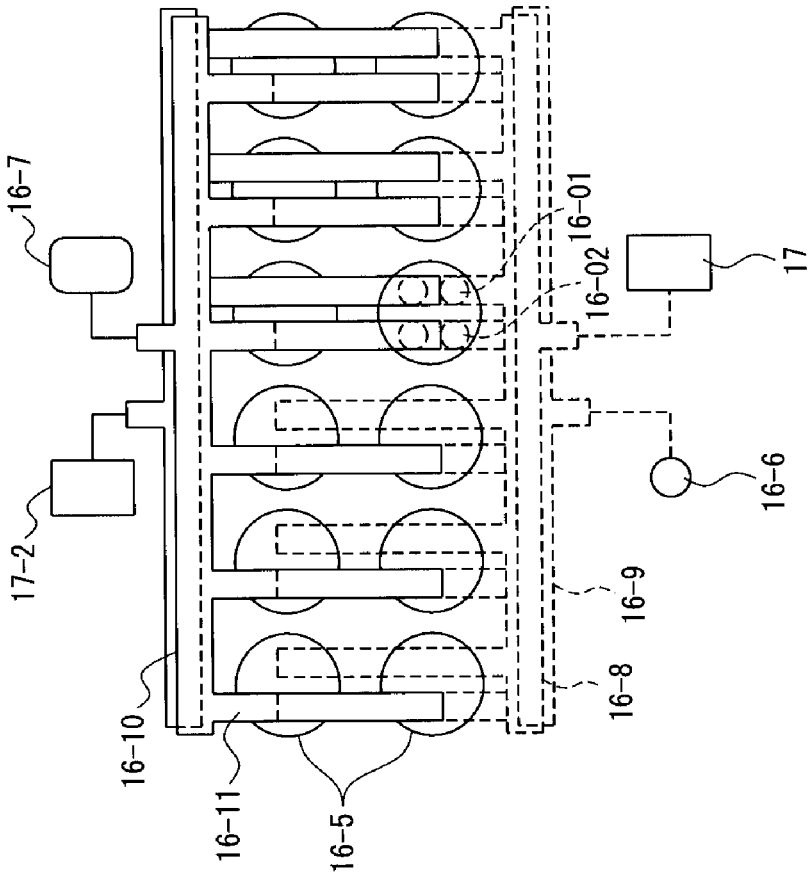
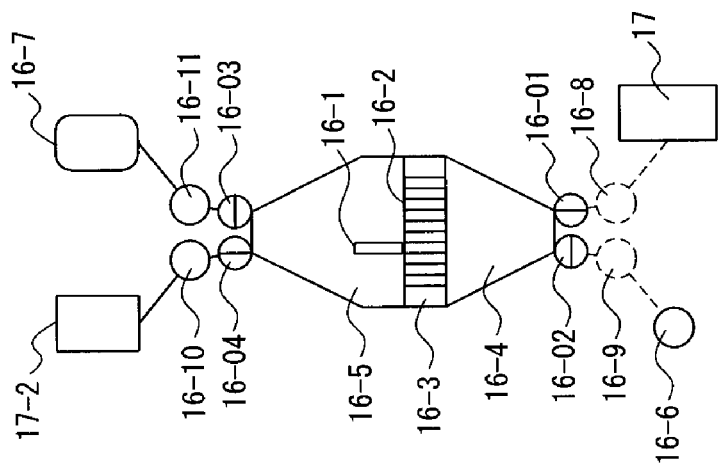
FIG. 10B
FIG. 10A

SUPERHEATED STEAM GENERATOR, ELECTRIC POWER GENERATING SHIP, AND CONNECTION ROBOT

TECHNICAL FIELD

The present invention provides a superheated steam generator capable of generating superheated steam superior in transfer efficiency necessary for converting natural energy such as thermal energy or the like available from the seawater or the sun, with less environmental burden.

The present invention in particular relates to a zeolite type superheated steam generator for generating superheated steam by adsorbing and desorbing water into and from zeolite in a reversible manner, with the use of the above natural energy.

BACKGROUND

Conventionally, there is known superheated steam as a medium superior in transfer efficiency necessary for converting thermal energy to another type of energy such as electric energy.

In order to generate the above superheated steam, for example, there are conceivable devices and methods of using a reversible reaction represented by the following equation (18) to make externally available hot or cold energy having certain temperatures from a reactor and an evaporator-condenser. However, it is difficult in fact.

$$CaO + H_2O \leftrightarrows Ca(OH)_2 + Q \text{ [kcal]} \tag{18}$$

To address the above difficulty, JP H10-89799 A, herein referred to as Patent Document 1, discloses a chemical heat pump ($CaO/Ca(OH)_2$ series chemical pump) in which a heat exchanger is arranged with each of the reactor and the evaporator-condenser thereby making hot heat and cold heat to be retrievable successively.

In addition, JP H09-103670 A, herein referred to as Patent Document 2, discloses, as a device for generating superheated steam, a chemical reaction heat pump device that is almost permanently usable with the use of a reversible reaction series used for a chemical reaction heat pump, that is, with the use of 2-propanol/acetone/hydrogen reaction series, but without the need of resupplying a reactant.

Specifically, the above chemical reaction heat pump uses zeolite as a reaction catalyst in the following equation (19).

$$C_3H_7OH(\text{2-propanol}) + Q_1 \text{ [kcal] [80-100 [° C.]] (heat waste)} = C_3H_6O(\text{acetone}) + H_2 (\text{hydrogen}) + Q_2 \text{ [kcal] [120-300 [° C.]]} \tag{19}$$

Furthermore, JP 2001-263952 A, herein referred to as Patent document 3 discloses, as a device for generating superheated steam, a chemical heat pump dryer capable of effectively using excess energy such as nighttime power or the like and using calcined lime and hydrated lime and the like, thereby making the stocked and stored energy retrievable at a necessary timing.

Such a chemical heat pump dryer is provided with a reactor on the high temperature side, a chemical heat pump, a dryer, a heat exchanger, and a heat supplier.

The reactor on the high temperature side internally includes a chemical reactant (CaO). Also, the chemical heat pump has a reactor on the low temperature side for supplying and receiving a gas that reacts with the chemical agent of the reactor on the high temperature side.

The dryer is connected via an air circulating flow passage to the above reactor on the high temperature side and the reactor on the low temperature side. Also, the heat exchanger is arranged at the air circulating flow passage in the reactor on the high temperature side to heat the circulating air with the heat of chemical reaction of a chemical agent and a reactant gas. Moreover, the heat supplier is arranged in the reactor on the high temperature side.

With such a configuration, the above chemical heat pump dryer stocks and stores the energy of nighttime electricity or high temperature gases supplied from the exterior as a heat amount of heat necessary for generation of chemical reactant.

Then, since the energy saved in the above chemical reactant is made retrievable when it is necessary, even if the power supply is widely varied, it is possible to dry a processed work in a uniform manner under stable conditions. It is therefore possible to provide a safe system that applies a lighter load onto the environment.

Additionally, JP S62-36898 A (pages 1, 2, FIG. 1), herein referred to as Patent document 4, discloses as a device for generating superheated steam, a submersible-floating solar power generation device provided with an anchoring member that couples a craft barge and solar cells.

In this device, the craft barge is constructed with an air supply chamber to be submersible and floatable, and the solar cells are arranged at the craft barge. Furthermore, the anchoring member is coupled to a base substance at the sea bottom movably in a vertical direction and in a floatable manner.

Meanwhile, Kousuke AIUCHI "sunlight collecting system development—trial operation of a sensor controlling heliostat" The Institute of Applied Energy, Journal Applied Energy Engineering Vol. 26, No. 2 (2003. 7), p. 70, referred to as Non-Patent Document 1, describes a method of collecting sunlight with a reflecting mirror to make high temperature available for solar heat power generation.

Non-Patent Document 1 further describes that there was a Sun Shine Project in Japan as a similar solar heat power generation method, but it has not been put into practical use due to disadvantage in the sunshine condition or the like, whereas in the US, commercial plants are put to practical use.

Non-Patent Document 1 also describes that the power generation with the use of solar heat power generation having a tower configuration is expected because of the success of Solar Two (US, California, 10 MW) using a heliostat of flat mirror configuration.

In the implemented examples in the US and Japan, a method is employed in such a manner that the sunlight collected by lots of minors dissolves the molten salt that is a heat catalyst in a melting furnace installed on the top portion of a tower being several tens of meters high from the ground, and high-temperature steam is generated by high-pressure water introduced thereinto.

In this method, since the dissolved temperature of the molten salt is substantially fixed, the advantage of making high-temperature and high-pressure vapor easily available is utilized.

"Sunshine Project Outcome Report brief Overview" 1984 Agency of Industrial Science and Technology, p. 1-p. 106, referred to herein as Non-Patent Document 2, describes the contents of experiments and researches in relation to the solar heat power generation of a tower type light collection method, installed in Nio-cho, Mitoyo City, Kagawa Prefecture, Japan.

In the above experiments and researches, it is possible to obtain the power generation output of 2 MW, by use of steam of 12 atmosphere pressure (1.2 MP) at 300° C., under the conditions of turbine back-pressure 700 mHg (0.092 MP) and turbine shaft rotation frequency 7870 rpm.

SUMMARY OF THE INVENTION

It is to be noted that, however, the $CaO/Ca(OH)_2$ series chemical pump disclosed in Patent Document 1 has difficulty in outputting superheated steam with a high efficiency of heat transfer.

In addition, the chemical reaction heat pump disclosed in Patent Document 2 makes the heat energy (for example 0° C., 16 atmosphere pressure of high-pressure steam 900 l/Hr) externally retrievable in the exothermic reaction of the right side of the chemical equation. In other words, the chemical reaction heat pump disclosed in Patent Document 2 is not a pump that can be used almost permanently.

Furthermore, it is difficult for the chemical heat pump drier disclosed in Patent Document 3 to output the superheated steam with a high heat transfer, like the $CaO/Ca(OH)_2$ series chemical pump disclosed in Patent Document 1.

Moreover, in the submersible-floating solar power generation device disclosed in Patent Document 4, a craft barge is anchored to the base at the sea bottom and the sunlight solar cells are arranged on the ship. This makes it impossible to anchor the ship body at the sea bottom during the electric power generation.

In the solar heat power generation method disclosed in Non-Patent Document 1, a large amount of chemical active substances such as sodium sulfate, potassium sulfate, or the like are consumed. Therefore, this is not desirable in light of environmental burden.

Also, in the experiments and researches disclosed in Non-Patent Document 2, no consideration is given to the energy storing idea for continuously performing the power generation necessary for solving the problem of intermittent operations due to the limited sunshine hours. The operation is difficult unless it is installed in an area with stable sunshine hours. This has been confirmed that according to the results of the experiments and researches described in Non-Patent Document 2, by storing the detailed operation data of substantial components in a small-sized comprehensive test device to provide further studies.

That is to say, in the methods proposed by Agency of Industrial Science and Technology of Japan and Office of Energy of US (the above-described "Solar Two"), the high-pressure and high-temperature steam is generated by use of molten salt. In these methods, however, it is easy to obtain the high-temperature and high-pressure steam, whereas it is difficult to stock the energy for a long period of time. This is because a large amount of an extremely active acid substance has to be kept at high temperatures. If electricity is consumed for keeping the temperatures, the decrease in the overall energy efficiency cannot be avoided. Accordingly, it is difficult to apply the above-described methods using the molten salt in an area other than the area with stable sunshine conditions such as a desert area.

The present invention has been made in view of the above problems, and has an object of providing a superheated steam generator capable of generating the superheated steam with less environmental burden, an electric power generating shop, and a remote control arm, but without a limit of sunshine conditions or the like.

In order to address the above drawbacks, in an embodiment, there is provided a superheated steam generator for generating superheated steam by use of zeolite, including: a water supply device for causing the zeolite to adsorb mist-state moisture to heat the zeolite; a zeolite boiler system having a desorption heater for desorbing water molecules adsorbed onto the zeolite and for heating the zeolite to generate the superheated steam; a low-temperature purified water tank for storing purified water subject to heat exchange with at least one of seawater and surface water, and for supplying the purified water subsequent to the heat exchange to the water supply device; and an atomization device for generating the purified water supplied to the water supply device as the mist-state moisture.

It is to be noted that the "surface water" denotes water existing in the surface of land, and includes water in rivers, ponds, and lakes and water stocked in artificial water stocking facilities such as water purifying plants.

Next, in an embodiment herein, the atomization device causes a temperature of the purified water to be supplied to the water supply device from the low-temperature purified water tank to be lower than a temperature of water subject to the heat exchange with the purified water stored in the low-temperature purified water tank, by use of latent heat of vaporization produced when the mist-state moisture is generated.

Next, in an embodiment herein, there are further comprising a nonadiabatic pressure pump for compressing the superheated steam produced by the zeolite boiler system to generate high-temperature and high-pressure superheated steam higher in temperature and pressure than the superheated steam produced by the zeolite boiler system; and a high-temperature and high-pressure superheated steam tank for storing the high-temperature and high-pressure superheated steam generated by the nonadiabatic pressure pump and outputting the stored high-temperature and high-pressure superheated steam to a steam turbine power generator.

Next, in an embodiment herein, the high-temperature and high-pressure superheated steam tank includes: a high-temperature and high-pressure superheated steam stock for stocking the high-temperature and high-pressure superheated steam; and a circulating passage for recovering heat energy leaked from the high-temperature and high-pressure superheated steam stock.

Next, in an embodiment herein, there are further including: a high-temperature water stock for stocking high-temperature water heated by solar heat source energy; and a solar heat storage warm-keeping tank provided around the high-temperature water stock, wherein the solar heat storage warm-keeping tank includes a medium-temperature water layer for recovering heat energy leaked from the high-temperature water stock.

Next, in an embodiment herein, the zeolite boiler system includes: a plurality of furnace bodies, some of the furnace bodies constituting a first furnace body line in which multiple furnace bodies are connected by a pipe arrangement, the others of the furnace bodies that do not constitute the first furnace body line constituting a second furnace body line in which multiple furnace bodies are connected by a pipe arrangement; and a reaction switching control device for alternately switching between the first furnace body line and the second furnace body line to an adsorbing furnace body line in which the moisture is adsorbed onto the zeolite by the water supply device and a desorbing furnace body line in which the moisture in the zeolite is desorbed by the desorption heater.

Next, in an embodiment herein, there is provided an electric power generating ship comprising the superheated steam generator, and installed on the water for heat exchange with the purified water stored in the low-temperature purified water tank, wherein the superheated steam is generated while the solar heat source energy is being taken into the desorption heater and seawater source energy is being taken into the low-temperature purified water tank.

Next, in an embodiment herein, the low-temperature purified water tank is arranged at a position lower than a surface of water subject to the heat exchange with the purified water stored in the low-temperature purified water tank to be in contact with the water subject to the heat exchange with the purified water stored in the low-temperature purified water tank.

Next, in an embodiment herein, there is provided a connection robot for connecting the electric power generating ship an in-water installed power cable installed at the bottom of water subject to the heat exchange with the purified water stored in the low-temperature purified water tank, the connection robot comprising a remote control arm for connecting an in-water power cable arranged in the water subject to the heat exchange with the purified water stored in the low-temperature purified water tank to a terminal of the in-water installed power cable.

According to the present invention, purified water is used as an energy agent and zeolite is used as an active medium, so that the purified water is adsorbed onto and desorbed from zeolite in a reversible manner to produce the superheated steam. In this situation, in the adsorption process, the water source energy such as seawater source energy available from seawater is taken into the mist-state moisture of the purified water to be adsorbed onto zeolite. Meanwhile, in the desorption process, the solar heat source energy is available. Incidentally, the water source energy is not limited to the energy source from seawater, but may be water from a river or lake.

In particular, when the seawater source energy is taken in, the temperature of the purified water is lower than that of the seawater, in consideration of the latent heat of vaporization generated when the purified water is made to be mist-state moisture by a water supply device in the superheated steam generator. As a result, the seawater source energy is taken into the mist-state moisture given to zeolite by causing the energy to flow into the purified water in the superheated steam generator.

Thus, the actual output energy (the whole system output) that the superheated steam generator according to the present invention can generate the whole energy as in the form of superheated steam combining with the sum of the seawater source energy and the solar heat source energy.

In a case where in the power generating ship that mounts therein the superheated steam generator according to the present invention, the superheated steam generator is operated on the sea, it is made possible to convert the generated superheated steam to electric energy, for example, by a steam turbine power generator, so that such converted electric energy can be transmitted with direct current to a remote site that needs electric power by use of a connection robot for connecting the power generating ship and an in-water power cable via an electric terminal at the sea bottom.

BRIEF DESCRIPTION OF DRAWINGS

The description herein makes reference to the accompanying drawings wherein like reference numerals refer to like parts throughout the several views, and wherein:

FIG. 3A is a side sectional view partially cut away from the heliostat, and FIG. 3B is a top view of the heliostat;

FIG. 8 schematically illustrates the outline configuration of a power connection unit.

FIG. 9 is a schematic diagram of the outline configuration of a controlling system for the superheated steam generator according to the present invention;

FIG. 10 is a view illustrative of the configuration of a zeolite solid boiler;

DESCRIPTION OF EMBODIMENTS

Figure 1:
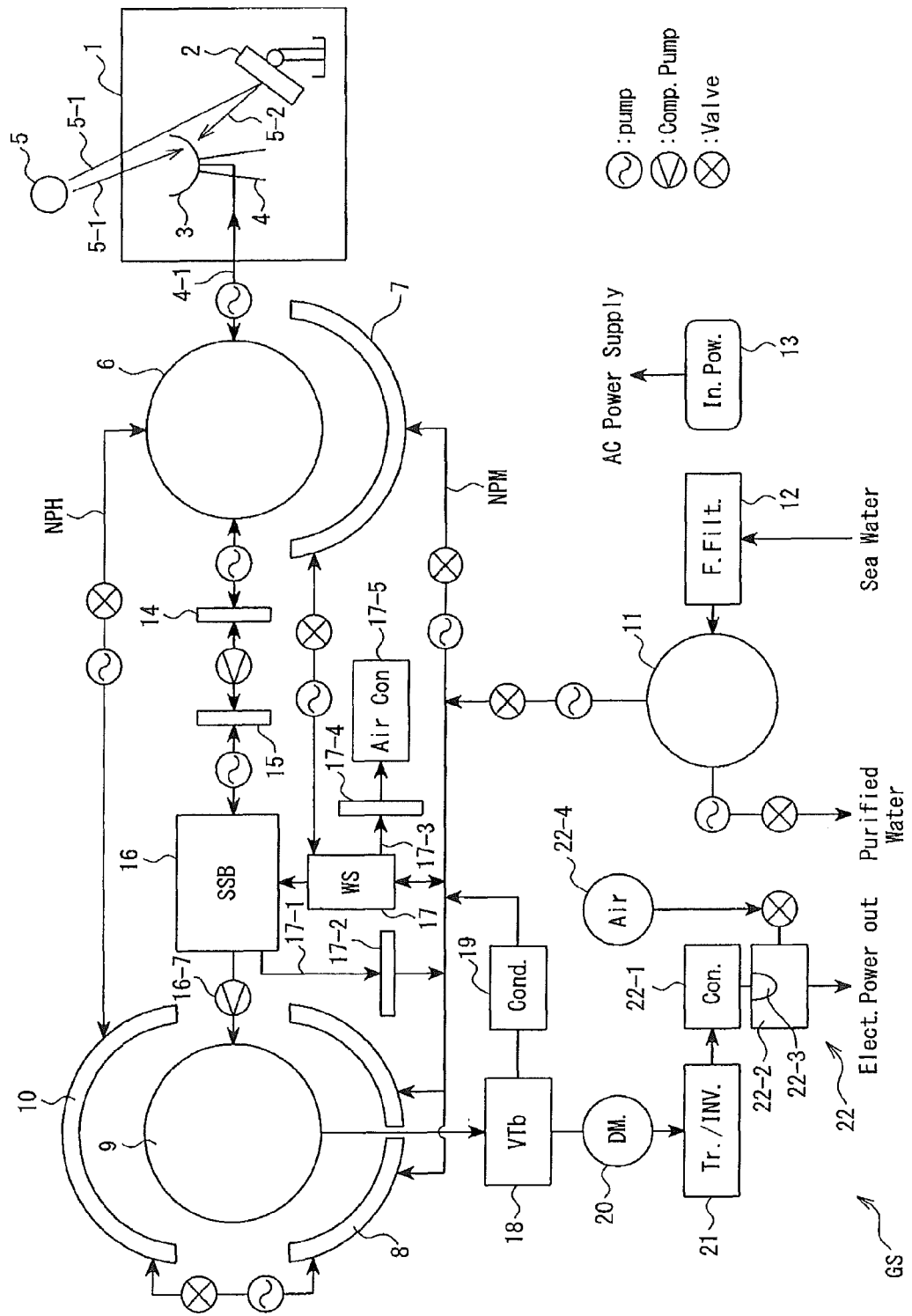
FIG. 1 is a schematic diagram of the outline configuration of a power generation system provided with a superheated steam generator according to the present invention.

Firstly, the outline of the present invention will be described, prior to the description of the structure, operation, and effects of the present invention.

The inventors of the present invention studied why the Sunshine Project of Japan had not been put into practical use (see non-Patent Document 1), and found that seawater is alternatively used for the insufficient energy source.

In other words, seawater source energy is almost inexhaustible. However, seawater is low in temperature, and has not been used for electric power generation conventionally. Besides, there have been proposals of using the difference in temperature of water or tidal power for power generation, but there were drawbacks of places and equipment and such proposals have not been achieved.

Meanwhile, hydraulic power generation has already been traditionally put into practice by use of potential energy of water. However, the place should be carefully selected and its size should be limited. This is not universally suited. Also, the solar heat power generation system that does not use any fossil fuels at all is a system with less environmental burden applied on the environment. However, the practical use is delayed at present.

The reason why the practical use is delayed is that basically in the solar heat power generation system, moisture vapor is generated by the solar heat and an electric generator is driven by a vapor turbine so as to make the electric energy available. However, any place on the earth has a feature of being influenced by sunshine hours or weather, therefore making it difficult to generate steady electric power continuously.

The present invention proposes several new ideas in the following description so as to address the above several drawbacks.

Specifically, the present invention is directed to a method for storing excess energy out of energy available from the solar heat and for not losing the stored energy, and is also directed to a method for obtaining electric energy without the need of a broad area on land. This is a method of focusing the point in which when the total energy amount available during sunshine hours is set greater than the entire energy amount for rated output, the excess energy of the energy available from the solar heat can be stored.

In addition, the present invention is provided for obtaining the advantages of continuous energy generation, as a result of using usual water as an energy agent and zeolite as an active medium without using active molten salt that is a medium with more environmental burden.

Furthermore, according to the present invention, there is provided a reversible reactive pump with the use of zeolite that is a heat pump capable of outputting the superheated steam with high efficiency of transfer, with the superheated steam being uniform in a molecular order, and with the use of not only heat transfer but also heat radiation.

Moreover, according to the present invention, in order to heat zeolite, the seawater source energy is taken in the form of latent heat into mist-state moisture adsorbed onto zeolite.

Additionally, according to the present invention, since the installment location of the electric power generating ship is rather freely selectable in a various manner, the limit caused by the sunshine conditions can be reduced.

A first embodiment of the present invention (hereinafter, referred to as present embodiment) will be described with reference to the attached drawings.

Firstly, with reference to FIG. 1 to FIG. 12, the configuration of a superheated steam generator according to the present embodiment and that of an electric power generating ship in which the superheated steam generator is mounted will be described.

Figure 2:
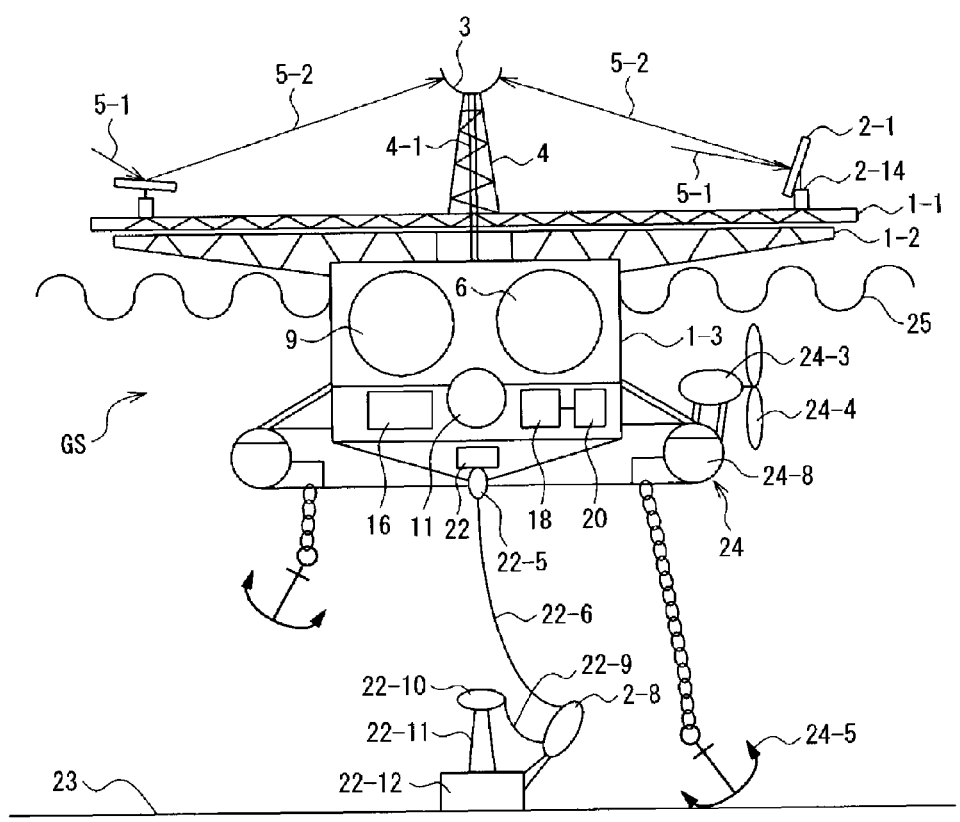
FIG. 2 is a view illustrative of the outline configuration of an electric power generating ship in which the superheated steam generator according to the present invention is mounted.

Referring now to FIG. 1 and FIG. 2, the electric power generating ship GS in which the superheated steam generator is mounted is provided with a solar heat collecting site 1.

Specifically, a doughnut-shaped submergence levitation body 24 operates the navigation, vertical movement toward the sea surface and sea bottom, and the orientation control in latitude and longitude of the electric power generating ship GS. The configuration of the doughnut-shaped submergence levitation body 24 will be described later.

The solar heat collecting site 1 is provided with a deck body structure 1-1 that is an on-board structure frame deck of the electric power generating ship GS; a deck pillar 1-2 that supports the deck body structure 1-1; and a ship body 1-3 of the electric power generating ship GS. The top surface of the deck body structure 1-1 is arranged with a heliostat 2; a tightly sealed iron pan 3; and a solar heat iron tower 4.

It should be noted that in the drawing, only one heliostat 2 arranged on the top surface of the deck body structure 1-1 is illustrated, as an example. However, in fact, multiple heliostats 2 are arranged on the top surface of the deck body structure 1-1. This is because the present invention has a purpose of continuously performing solar heat power generation without being influenced by the weather. Multiple heliostats 2 that obtain the solar energy have to be arranged on the top surface of the ship body of the electric power generating ship GS.

The heliostats 2 has an equatorial planar folding mirror for receiving the energy from sunlight, reflects the sunlight emitted by the sun 5, and collects the sunlight to tightly sealed iron pan 3 arranged on the solar heat iron tower 4 so as to heat the tightly sealed iron pan 3. Specifically, in FIG. 1 and FIG. 2, the sunlight emitted by the sun 5 is indicated by an incident light 5-1 that enters the heliostat 2 from the sun 5, and a reflected light 5-2 that is reflected by the heliostat 2 to be irradiated to the tightly sealed iron pan 3. Likewise, in FIG. 2, the reference numeral 23 indicates the sea bottom, and the reference numeral 25 indicates the sea level and waves. Moreover, the incident light 5-1 includes the incident light 5-1 directly irradiated from the sun 5 to the tightly sealed iron pan 3.

With such a configuration, according to the present invention, in order to supply energy to the superheated steam generator with the solar heat source energy, the sunlight (5-1) is reflected (5-2) by multiple heliostats 2 to collect the lights onto the tightly sealed iron pan 3.

Regarding multiple heliostats 2, the total heliostat receiving area that is the total value of the receiving areas of all the heliostats 2 is set beforehand so that the energy amount obtainable by the average amount of sunshine is greater than the one-day output including the loss in all processes.

Figure 3:
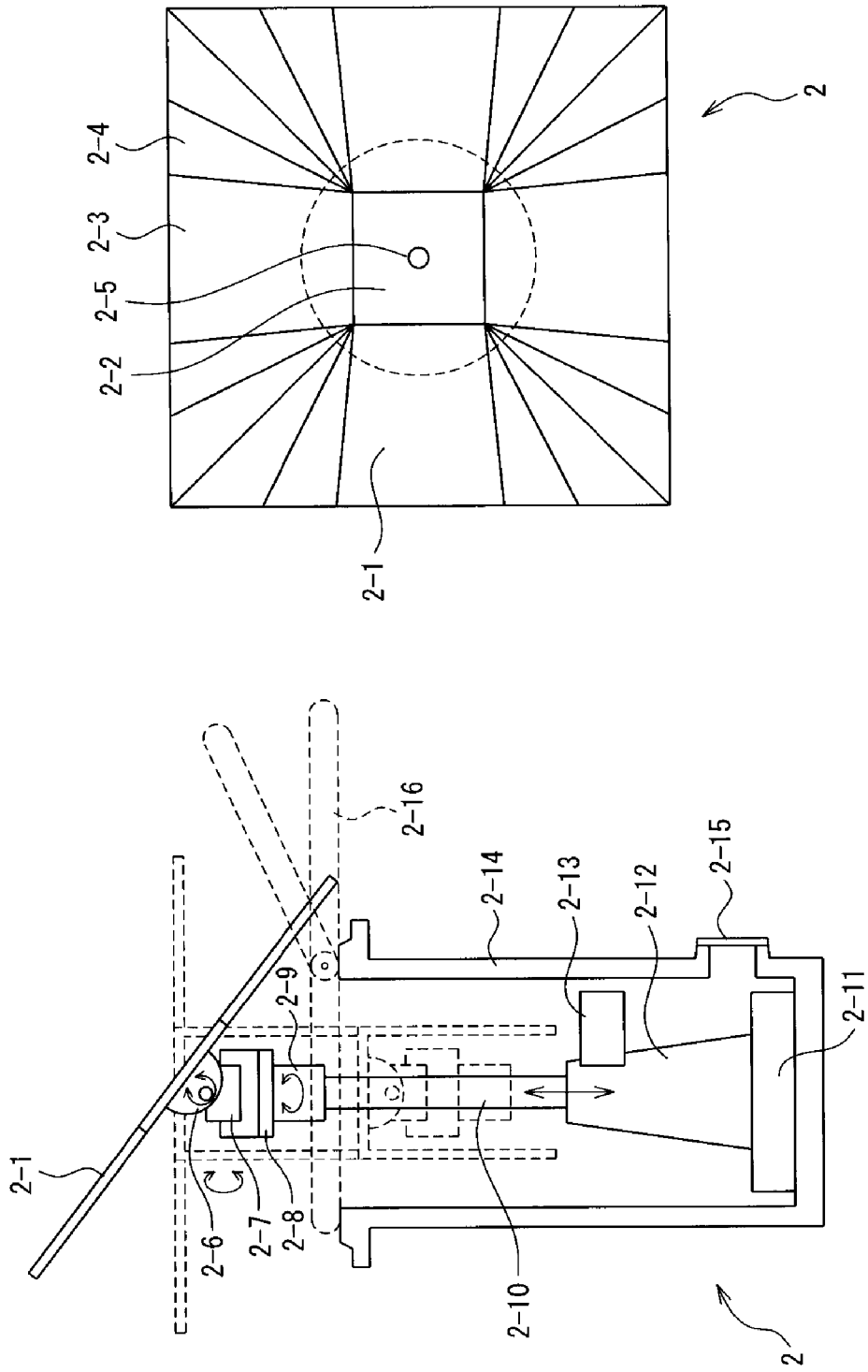
FIG. 3 schematically illustrates the outline of each part of a heliostat.

The outline configuration of the heliostat 2 will be described with FIG. 3, also with reference to FIG. 1 and FIG. 2.

In FIG. 3A and FIG. 3B, the reference numeral 2-1 indicates a latitudinal planar minor, the reference numeral 2-2 indicates a vertical point planar mirror, the reference numeral 2-3 indicates longitudinal planar mirror, and the reference numeral 2-4 indicates an angular part folding planar mirror. Likewise, the reference numeral 2-5 indicates a position monitor, the reference numeral 2-6 indicates a latitudinal controller (having a drive part and a control circuit therein), the reference numeral 2-7 indicates a longitudinal controller, and the reference numeral 2-8 indicates an equatorial mount. In addition, the reference numeral 2-9 indicates an equatorial controller, the reference numeral 2-10 indicates a heliostat up-and-down column, the reference numeral 2-11 indicates a heliostat base, and the reference numeral 2-12 indicates a heliostat up-and-down shaft bearing. Furthermore, the reference numeral 2-13 indicates a heliostat up-and-down controller, the reference numeral 2-14 indicates a heliostat storing RC cavity, the reference numeral 2-15 indicates a control power inlet, and the reference numeral 2-16 indicates an RC cavity lid.

The latitudinal planar mirror 2-1, the vertical point planar minor 2-2, the longitudinal planar minor 2-3, and the angular part folding planar mirror 2-4 are respectively formed to have a light weight.

Also, the latitudinal planar mirror 2-1, the vertical point planar mirror 2-2, the longitudinal planar minor 2-3, and the angular part folding planar mirror 2-4 are automatically folded to be accommodated in the heliostat storing RC cavity 2-14 to avoid strong winds and waves for destructive impacts.

Specifically, the heliostat storing RC cavity 2-14 is provided with the RC cavity lid 2-16 that automatically closes after storing the latitudinal planar minor 2-1, the vertical point planar minor 2-2, the longitudinal planar minor 2-3, and the angular part folding planar mirror 2-4. Each part is operated by a servomotor and a built-in computer, and each part is controlled from an operator's room by wireless remote control. Additionally, the sunlight tracking control or the like is performed by a program beforehand input into the built-in computer.

Figure 4:
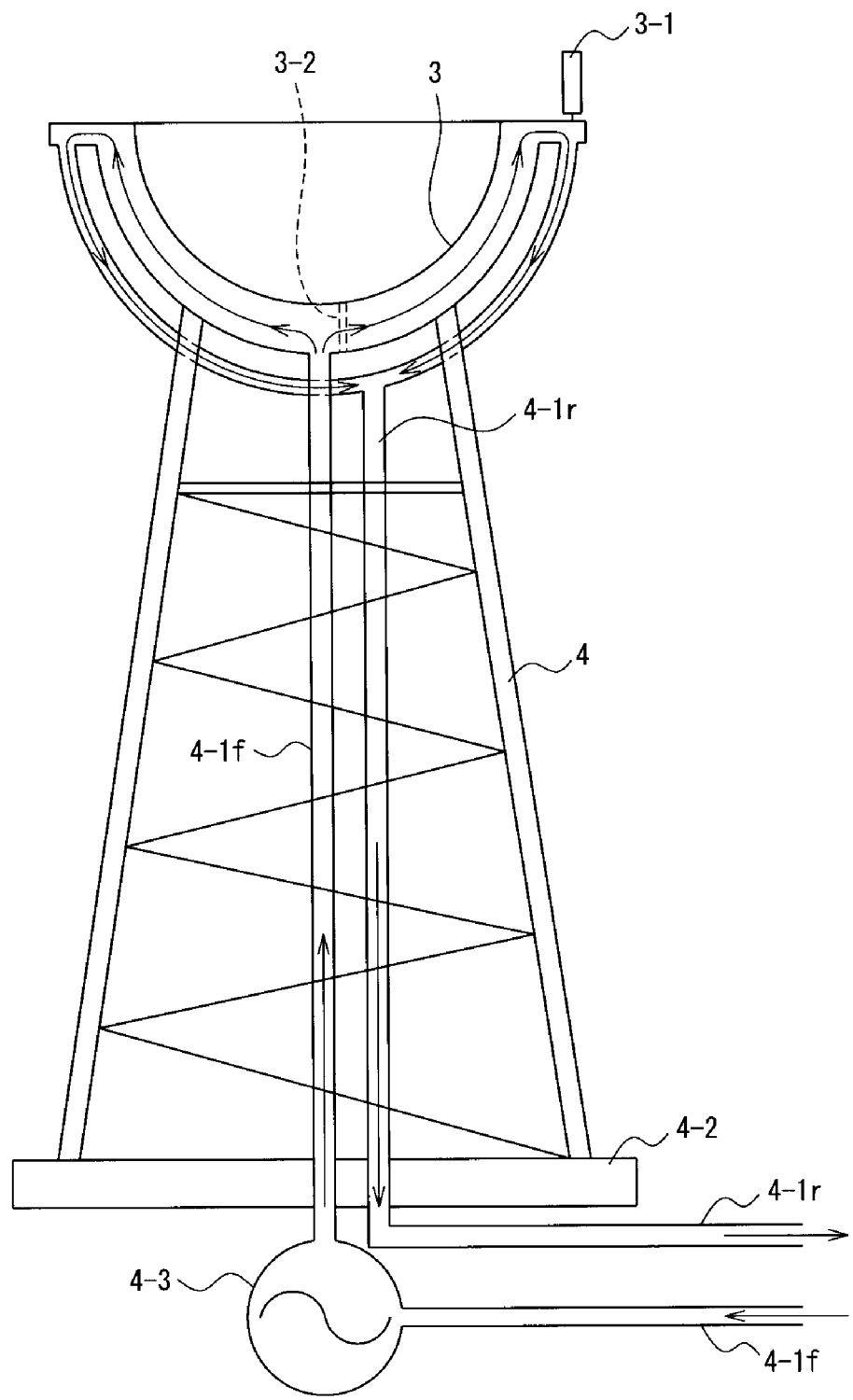
FIG. 4 is a view illustrative of the outline configuration a tightly sealed iron pan and that of a solar heat iron tower.

The configuration of the tightly sealed iron pan 3 and the solar heat iron tower 4 will be described with FIG. 4, also with reference to FIG. 1 and FIG. 2. FIG. 4 is a view illustrative of the outline configuration of the tightly sealed iron pan 3 and the solar heat iron tower 4. As illustrated in FIG. 4, the tightly sealed iron pan 3 is formed to be a hemisphere with an opening part facing upwards, and is arranged on the solar heat iron tower 4. Also, the tightly sealed iron pan 3 is provided with a safety valve 3-1, and a rain water drain 3-2. The solar heat iron tower 4 is arranged at the center of the deck body structure 1-1, and is provided with a pipe arrangement 4-1f, a pipe arrangement 4-1*r* (in the drawing, forth is "f" and rear is "r"), an iron tower basis 4-2, and a lifting pump 4-3.

Then, the heliostat 2 reflects the sunlight 5 to collect the sunlight onto the tightly sealed iron pan 3. After the tightly sealed iron pan 3 is heated, the normal water (the water to be used is, for example, softened water that is made available after the seawater is filtered) is passed into such a heated tightly sealed iron pan 3 with the use of the lifting pump 4-3 through the pipe arrangement 4-1*f* and the pipe arrangement 4-1*r*. Thus, the water passed into the tightly sealed iron pan 3 is stored in a solar heat storage multilayer warm-keeping tank 6 illustrated in FIG. 1 as warm water with high temperatures (for example, 80 to 100° C.).

In this situation, when the excessive pressure is generated inside the tightly sealed iron pan 3, the safety valve 3-1 operates to control the lifting pump 4-3.

Figure 5:
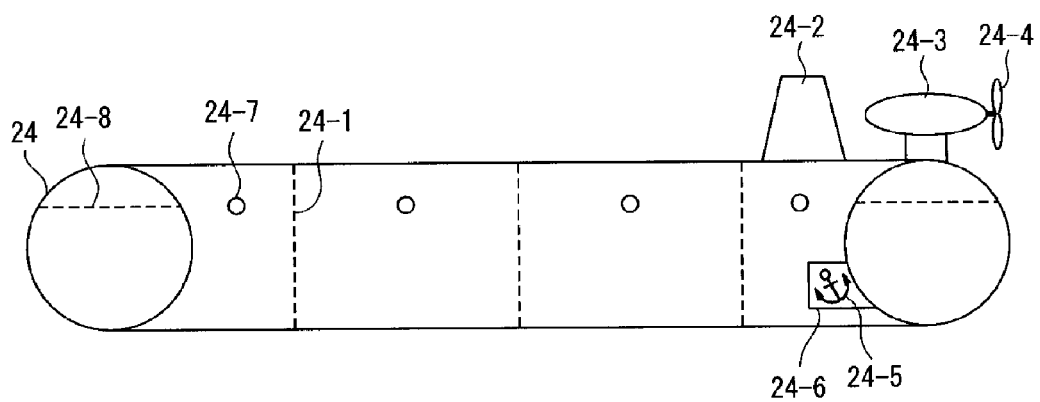
FIG. 5 is a view illustrative of the outline configuration of a doughnut-shaped submergence levitation body.

The doughnut-shaped submergence levitation body 24 provided in the electric power generating ship GS in which the superheated steam generator according to the present invention is mounted will be described with FIG. 5, also with reference to FIG. 1 and FIG. 2. FIG. 5 is a view illustrative of the outline configuration of the doughnut-shaped submergence levitation body 24.

As illustrated in FIG. 5, the ship body of the doughnut-shaped submergence levitation body 24 is an annular and doughnut-shaped ship body having a circular cross-section, and drives the electric power generating ship GS for the navigation, vertical movement toward the sea surface and sea bottom, and the orientation control in latitude and longitude of the electric power generating ship GS.

Specifically, in the vertical movement toward the sea surface and sea bottom, for example, the whole electric power generating ship GS is receded below the water surface so as to protect the tightly sealed iron pan 3 arranged on the solar heat iron tower 4 from the destructive impact caused by the strong winds and ocean waves.

The doughnut-shaped submergence levitation body 24 is provided with a partition wall 24-1, a ship body control block 24-2, a ship body drive motor 24-3, a propeller screw 24-4, an anchor 24-5, an anchor controller 24-6, and a seawater in/out hole 24-7. The partition wall 24-1 partitions an inner space of the doughnut-shaped submergence levitation body 24 into multiple partition rooms. Each of the partition rooms partitioned by the partition wall 24-1 is provided so that seawater 24-8 can flow it into and flow it out.

The ship body control block 24-2 includes control equipment, compressed air storage, operation board, and the like, and has a space where an operator is always stationed. Six ship body drive motors 24-3 are installed at arbitrary positions in the doughnut-shaped submergence levitation body 24, respectively, and the propulsive directions are changeable by remote control. The propeller screw 24-4 is a variable-pitch propeller screw. In the seawater, the propeller screw 24-4 is capable of outputting the rotation speed necessary for a slow speed, whereas on the ocean, the propeller screw 24-4 is capable of outputting the rotation speed necessary for the aerodynamic force propulsion.

The anchor 24-5 is anchor for anchoring and securing. During the power generation, the anchor 24-5 is lifted up on the ship to ensure a free slow operation of the ship body and the position control to block off the influence from the bottom of the sea. The movement of the entire ship body is set at a certain latitude and a certain longitude in the accuracy range of GPS, and moves freely in the extended range of the in-water cable. Herein, GPS (Global Positioning System) is a navigation system with the use of satellite.

The anchor controller 24-6 is provided with a winch, motor, and the like, and is a device for controlling the operation of the anchor 24-5.

The seawater in/out hole 24-7 are holes for seawater to flow it into and flow it out when the seawater flows into the doughnut-shaped submergence levitation body 24 and flows out of the doughnut-shaped submergence levitation body 24.

Specifically, the operation of each of the above devices is controlled by signals transmitted from the electric power generating ship GS and built-in computers provided in each of the devices, and is carried out by information demand signals issued from a control room (not illustrated) in the electric power generating ship GS.

Referring back to FIG. 1 and FIG. 2, the description will be given again. As illustrated in FIG. 1 and FIG. 2, the superheated steam generator mounted in the electric power generating ship GS is provided with: a solar heat storage multilayer warm-keeping tank 6; a medium-temperature water tank 7; a medium-temperature water tank 8; a multilayer warm-keeping storage tank 9; and a high-temperature heat storage tank 10. In addition to them, the superheated steam generator mounted in the electric power generating ship GS is also provided with: a low-temperature purified water tank 11; an inverse osmotic pressure sea water purifying device 12; an initial stage power unit 13; a first heat exchanger 14; a second heat exchanger 15; and a zeolite boiler system 16. Furthermore, the superheated steam generator mounted in the electric power generating ship GS is provided with: a water supply device 17; a vapor turbine 18; a condenser 19; an AC dynamo 20; a transformer/AC-DC inverter 21; and a power connection unit 22.

Specifically, in FIG. 1, the inverse osmotic pressure sea water purifying device 12 is indicated by "F.Filt.", the initial stage power unit 13 is indicted by "In. Pow.", the zeolite boiler system 16 is indicted by "SSB", the water supply device 17 is indicted by "WS". Likewise, in FIG. 1, the vapor turbine 18 is indicted by "VTb", the condenser 19 is indicted by "Cond.", the AC dynamo 20 is indicted by "DM.", and the transformer/AC-DC inverter 21 is indicted by "Tr./INV.".

Figure 6:
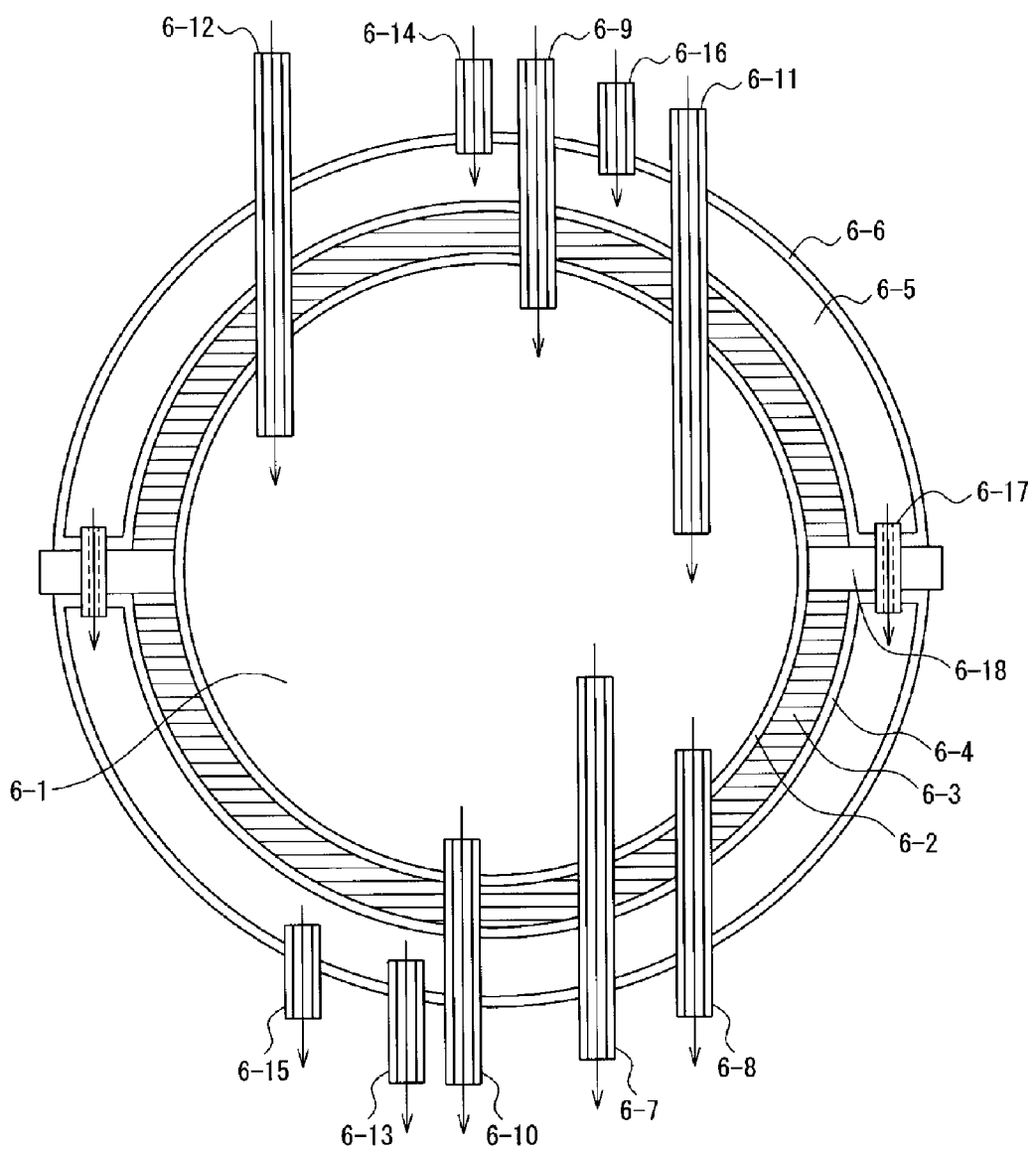
FIG. 6 schematically illustrates the outline configuration of a solar heat storage multilayered warm-keeping tank.

Now, the outline configuration of the solar heat storage multilayer warm-keeping tank 6 will be described with FIG. 3, also with reference to FIG. 1 and FIG. 2. FIG. 6 schematically illustrates the outline configuration of the solar heat storage multilayer warm-keeping tank 6. The solar heat storage multilayer warm-keeping tank 6 is a tank for temporarily storing high-temperature water of approximately 80 to 100° C. heated by the solar heat energy source in the solar heat collecting site 1, and is capable of supplying the energy to the zeolite solid boiler 16. Specifically, the solar heat storage multilayer warm-keeping tank 6 is capable of storing excessive energy out of the energy available from solar heat. In the following description, the water having temperatures as high as approximately 80 to 100° C. will be described as "HTW" in some cases.

For this end, with the capacity of the solar heat storage multilayer warm-keeping tank 6, it is possible to, for example, supply the energy to generate superheated steam even when it is not sunshine hours, in a case where the superheated steam generator according to the present invention is mounted and operated in the electric power generating ship GS for generation of superheated steam. Such a capacity is set beforehand to allow the storage of substantially seven day's average power generation energy, for example.

Also, since the solar heat storage multilayer warm-keeping tank 6 has to prevent the dissipation of the stored energy as much as possible, the solar heat storage multilayer warm-keeping tank 6 has to store a large volume and efficient heat insulation is necessary. Therefore, the solar heat storage multilayer warm-keeping tank 6 has a concentric spherical multilayer structure, which is advantageous for a pressure container.

In the present embodiment, the description will be given of a case where the multilayer structure of the solar heat storage multilayer warm-keeping tank 6 is a concentric spherical one, as an example. The structure of the solar heat storage multilayer warm-keeping tank 6, however, is not limited to this, and may be a cylindrical multilayer one.

In addition, the solar heat storage multilayer warm-keeping tank 6 is provided with: a high-temperature water stock 6-1; a steel spherical water tank 6-2; a heat-resistant brick wall 6-3; a medium-temperature heat storage water tank inner wall 6-4; and a medium-temperature heat storage water tank outer wall 6-6. The high-temperature water stock 6-1 is arranged at the center of the solar heat storage multilayer warm-keeping tank 6, and stores the above-described HTW.

The steel spherical water tank 6-2 surrounds the high-temperature water stock 6-1. The heat-resistant brick wall 6-3 is interposed between the steel spherical water tank 6-2 and the medium-temperature heat storage water tank inner wall 6-4, and forms a heat-insulating layer.

On the outer circumference side of the heat-resistant brick wall 6-3, medium-temperature heat storage water 6-5 lower in temperature than HTW is flown between the medium-temperature heat storage water tank inner wall 6-4 and medium-temperature heat storage water 6-5. In the following description, the water having temperatures of medium-temperature heat storage water 6-5 or as high as medium-temperature heat storage water 6-5 will be described as "MTW" in some cases.

Accordingly, the space between the medium-temperature heat storage water tank inner wall 6-4 and the medium-temperature heat storage water tank outer wall 6-6 corresponds to a medium-temperature heat storage water tank for storing the medium-temperature heat storage water 6-5.

Specifically, in FIG. 6, the reference numeral 6-7 represents an SSB high-temperature water outlet, reference numeral 6-8 represents a circulating high-pressure water outlet, reference numeral 6-9 represents a solar heated water inlet, the reference numeral 6-10 represents a solar heated water outlet, and the reference numeral 6-11 represents an SSB high-temperature water inlet. Likewise, the reference numeral 6-12 represents a circulating high-temperature inlet, the reference numeral 6-13 represents a medium-temperature water outlet, the reference numeral 6-14 represents a medium-temperature water inlet, the reference numeral 6-15 represents a circulating medium-temperature outlet, and the reference numeral 6-16 represents a circulating medium-temperature water inlet. Moreover, the reference numeral 6-17 represents a connecting tube that connects the medium-temperature heat storage tanks separated into the upper and the lower portions, and the reference numeral 6-18 represents a medium-temperature heat storage tack connecting ring.

Referring back to FIG. 1 and FIG. 2, the description will be given. The medium-temperature water tank 7 and the medium-temperature water tank 8 each have a circular spherical multilayer structure, and is a tack for storing heated water generated by recovering the leaked thermal energy from the solar heat storage multilayer warm-keeping tank 6 and the multilayer warm-keeping storage tank 9. Specifically, as illustrated in FIG. 1, the medium-temperature water tank 7 is arranged to surround the solar heat storage multilayer warm-keeping tank 6 and causes the leaked heat from the solar heat storage multilayer warm-keeping tank 6 to be absorbed in the stored heated water to recover and store the heat in a heat transferring manner.

Accordingly, the medium-temperature water tank 7 corresponds to a solar heat storage multilayer heat keeping tank provided around the high-temperature water stock 6-1 provided in the solar heat storage multilayer warm-keeping tank 6, and has a medium-temperature water layer for recovering the thermal energy leaked from the high-temperature water stock 6-1.

Meanwhile, the medium-temperature water tank 8 is arranged around the multilayer warm-keeping storage tank 9, and causes the heat leaked from the multilayer warm-keeping storage tank 9 to be absorbed in the stored heated water and recover and store the heat in a heat transferring manner.

In addition, the medium-temperature water tank 7 and the medium-temperature water tank 8 convert and store the heat by causing not only the heated water transferred from the third heat exchanger 17-2 but also the transferring leaked heat or waste heat generated in the entire superheated steam generator according to the present invention to be absorbed in the heated water.

Specifically, in FIG. 1, two tanks are illustrated as the medium-temperature water tank 7 and the medium-temperature water tank 8. However, the fact that the medium-temperature water tank 7 and the medium-temperature water tank 8 are illustrated as two tanks is that a single tank is separated into two to be closer to the heat sources, respectively. The medium-temperature water tank 7 and the medium-temperature water tank 8 are connected by pipe arrangement. Therefore, the medium-temperature water tank 7 and the medium-temperature water tank 8 have a function as a single tank.

When the temperature of the heated water stored in the medium-temperature water tank 7 and the medium-temperature water tank 8 rises and exceeds the temperature range of the medium-temperature water tank 7 and the medium-temperature water tank 8, the heated water stored in the medium-temperature water tank 7 and the medium-temperature water tank 8 is transferred to the solar heat storage multilayer warm-keeping tank 6 via a medium-temperature bidirectional pipe arrangement system NPM. In this manner, if there is an excessive water amount of the heated water stored in the medium-temperature water tank 7 and the medium-temperature water tank 8, it is possible to transfer the heated water stored in the medium-temperature water tank 7 and the medium-temperature water tank 8 to the solar heat storage multilayer warm-keeping tank 6 via the medium-temperature bidirectional pipe arrangement system NPM. Incidentally, in FIG. 1, the medium-temperature bidirectional pipe arrangement system NPM is indicated by a single line, but the medium-temperature bidirectional pipe arrangement system NPM is formed of multiple pipes in reality.

Furthermore, the medium-temperature water tank 7, the medium-temperature water tank 8, the low-temperature purified water tank 11, and the water supply device 17 are respectively connected by way of the pipe arrangement to equalize each temperature (temperature level) via the medium-temperature bidirectional pipe arrangement system NPM.

The water amount and water temperature of the members connected via the medium-temperature bidirectional pipe arrangement system NPM, that are, the medium-temperature water tank 7, the medium-temperature water tank 8, the low-temperature purified water tank 11 and the water supply device 17 are set and controlled by a reaction switching control device 16-C to be described later, based upon the measured water temperature, water amount, and the like.

Figure 7:
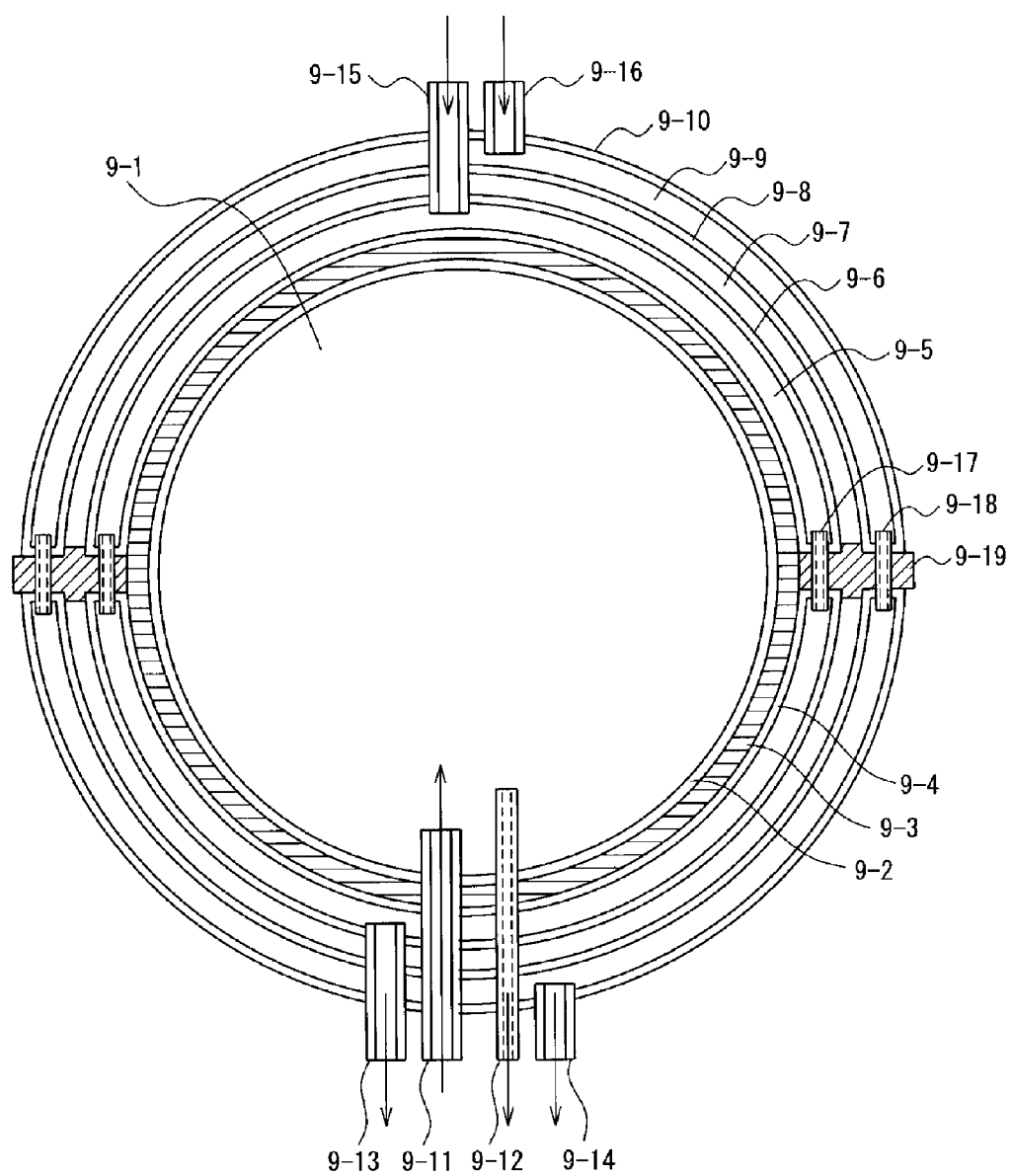
FIG. 7 schematically illustrates the outline configuration of a triply multilayered energy-keeping storage tank.

Now, the outline configuration of the multilayer warm-keeping storage tank 9 will be described with FIG. 7, also with reference to FIG. 1 and FIG. 2. FIG. 7 schematically illustrates the outline configuration of the multilayer warm-keeping storage tank 9. The multilayer warm-keeping storage tank 9 is a tank for storing the high-temperature and high-pressure superheated steam generated by the zeolite solid boiler 16. Also, the multilayer warm-keeping storage tank 9 is designed to store the superheated steam for time while the AC dynamo 20 can operate at a rated output. Then, when the superheated steam decreases to some extent, a nonadiabatic pressure pump 16-7 to be described later operates intermittently and causes the zeolite solid boiler 16 to resupply the superheated steam. In the present embodiment, as an example, a description will be given of a case where the multilayer warm-keeping storage tank 9 is capable of storing the superheated steam necessary for operating the AC dynamo 20 at a rated output for approximately 10 hours.

Moreover, the multilayer warm-keeping storage tank 9 temporarily stores the superheated steam prior to the supply of the superheated steam generated according to the present invention to the output utilization source such as the vapor turbine 18 or the like. However, in order to keep high temperature, efficient heat insulation is needed. Therefore, the multilayer warm-keeping storage tank 9 is formed to have a concentric spherical multilayer structure, which is advantageous as a pressure container, in the same manner as the solar heat storage multilayer warm-keeping tank 6.

Accordingly, the multilayer warm-keeping storage tank 9 corresponds to a high-temperature and high-pressure superheated steam tank that stores the high-temperature and high-pressure superheated steam generated by the nonadiabatic pressure pump 16-7, and then outputs the stored high-temperature and high-pressure superheated steam to a vapor turbine power generator to be described later.

Specifically, according to the present embodiment, the description will be given, as an example, of the multilayer structure of the multilayer warm-keeping storage tank 9 having a concentric and spherical shape. However, the structure of the multilayer warm-keeping storage tank 9 is not limited to this. The multilayer warm-keeping storage tank 9 may have a cylindrical multilayer structure.

In addition, the multilayer warm-keeping storage tank 9 is arranged to have a concentric spherical multilayer structure together with the medium-temperature water tank 8 and the high-temperature heat storage tank 10. Accordingly, the leaked energy from a high-temperature portion is successively absorbed in heated water stored in the medium-temperature water tank 8 and the high-temperature heat storage tank 10, which are tanks for lower temperatures than that of the tank 9.

Furthermore, in the multilayer warm-keeping storage tank 9, a heat-insulating and heat-resistant brick wall 9-3 is arranged at the outer circumference side of a steel spherical tank 9-2, via a steel spherical tank 9-2 that is an inner wall surrounding a high-temperature and high-pressure superheated steam stock 9-1.

The high-temperature and high-pressure superheated steam stock 9-1 is capable of storing the above-described high-temperature and high-pressure superheated steam. Accordingly, the high-temperature and high-pressure superheated steam stock 9-1 corresponds to a high-temperature and high-pressure superheated steam stock for storing high-temperature and high-pressure superheated steam generated by the nonadiabatic pressure pump 16-7.

Also, on the outer circumference side of the heat-insulating and heat-resistant brick wall 9-3, high-temperature heat storage water 9-5 having a temperature as high as the above-described HTW and having a relatively high heat capacity is stored in the spherical space surrounded by a high-temperature warm-keeping storage tank inner wall 9-4 and a high-temperature warm-keeping storage tank outer wall 9-6.

Moreover, there is provided an air insulating layer 9-7 between the high-temperature warm-keeping storage tank outer wall 9-6 and a medium-temperature heat storage water tank inner wall 9-8. Also, medium-temperature heat storage water 9-9 having a temperature as high as the above-described medium-temperature heat storage water 6-5 is introduced between the medium-temperature heat storage water tank inner wall 9-8 and a medium-temperature heat storage water tank outer wall 9-10.

Accordingly, the space between the medium-temperature heat storage water tank inner wall 9-8 and the medium-temperature heat storage water tank outer wall 9-10 corresponds to a medium-temperature heat storage tank for storing the medium-temperature heat storage water 9-9.

That is, the multilayer warm-keeping storage tank 9 is provided with a three-layered heat insulating jacket. In the three-layered heat insulating jacket, the innermost first layer is a heat-resistant brick, whereas the remaining two layers are spherical aquariums for high-temperature and medium-temperature water, respectively. The energy stored in the two-layered spherical aquariums is used in a circulating manner for the generation of the superheated steam.

The air insulating layer 9-7 is provided for insulating heat between the high-temperature heat storage water 9-5 and the medium-temperature heat storage water 9-9. The space for storing the medium-temperature heat storage water 9-9 is coupled with the space for storing the above-described medium-temperature heat storage water 6-5 by the medium-temperature bidirectional pipe arrangement NPM.

Specifically, the medium-temperature heat storage water 6-5 and the medium-temperature heat storage water 9-9 is flown back by a pump in both directions to the low-temperature purified water tank 11 and the water supply device 17 and is circulated in response to an instruction signal output from a reaction switching control device 16C-1.

This performs the control of the stored water in the medium-temperature heat storage water 6-5 and the medium-temperature heat storage water 9-9 at an appropriate temperature and the control of the distribution to the medium-temperature heat storage water 6-5 and the medium-temperature heat storage water 9-9 in an appropriate manner. Moreover, in the water supply device 17, water having temperatures as high as the medium-temperature heat storage water 6-5 and the medium-temperature heat storage water 9-9 can be reused as a heat source of vapor or mist of the water to be supplied to the zeolite solid boiler 16.

Incidentally, a medium-temperature heat storage water outlet 9-14 and a medium-temperature heat storage water inlet 9-16, a circulating heated water inlet 6-16, a medium-temperature water inlet 6-14, a circulating heated water outlet 6-15, and a medium-temperature water outlet 6-13 are coupled with the medium-temperature bidirectional pipe arrangement NPM, so as to be circulated with each other.

Likewise, a high-temperature heat storage water outlet 9-13 and a high-temperature heat storage water inlet 9-15, and the circulating high-pressure water outlet 6-8 and the circulating high-temperature inlet 6-12 provided in the solar heat storage multilayer warm-keeping tank 6 are coupled by a high-temperature bidirectional pipe arrangement NPH, so as to be circulated with each other.

Accordingly, the spherical space surrounded by the high-temperature warm-keeping storage tank inner wall 9-4 and the high-temperature warm-keeping storage tank outer wall 9-6 is arranged to surround the high-temperature and high-pressure superheated steam stock, and corresponds to a circulating water layer that recovers the thermal energy leaked from the high-temperature and high-pressure superheated steam stock.

Also, in FIG. 7, the reference numeral 9-11 represents a high-temperature and high-pressure superheated steam inlet, whereas the reference number 9-12 represents a high-temperature and high-pressure superheated steam outlet Likewise, the reference numeral 9-17 represents a high-temperature heat storage water tank connecting pipe that connects the medium-temperature heat storage water tanks separated into the upper and lower portions, whereas the reference numeral 9-18 represents a medium-temperature heat storage water tank connecting pipe Likewise, the reference numeral 9-19 represents a medium-temperature heat storage water tank connecting ring for the medium-temperature heat storage water tanks separated into the upper and lower portions.

Referring back to FIG. 1 and FIG. 2, the description will be given. The high-temperature heat storage tank 10 has a layered structure in a circular, spherical manner, and is reversely coupled with the solar heat storage multilayer warm-keeping tank 6 via the high-temperature bidirectional pipe arrangement NPH by way of a pipe arrangement to equalize or approximate the respective temperatures. Also, the high-temperature heat storage tank 10 is a tank for storing the heated water generated by recovering the thermal energy leaked from the multilayer warm-keeping storage tank 9 or the like.

That is to say, the amount of heat leaked to the outside from the high-temperature and high-pressure superheated steam stock 9-1 is recovered to the high-temperature heat storage water stored in the high-temperature heat storage tank 10, and is coupled to be circulated with the high-temperature heat storage water stored in the solar heat storage multilayer warm-keeping tank 6. Accordingly, the high-temperature heat storage water is reused as a thermal energy of the zeolite solid boiler 16.

Moreover, since the high-temperature heat storage tank 10 is coupled with the solar heat storage multilayer warm-keeping tank 6 via the high-temperature bidirectional pipe arrangement NPH, the water amounts in both tanks are adjustable.

The low-temperature purified water tank 11 is a tank for storing therein, for example, purified water generated by seawater by the inverse osmotic pressure sea water purifying device 12, is capable of exchanging heat between the purified water stored therein and the seawater, and supplies the purified water after the heat exchange to the water supply device 17.

In addition, the low-temperature purified water tank 11 is installed at a position corresponding to a gap below the sea surface in the exterior portion of the ship body of the electric power generating ship GS, for example, in the ship body outer hall of the electric power generating ship GS illustrated in FIG. 2, so that the ship body is made to float on the seawater and take in the thermal energy source from the seawater.

Specifically, the low-temperature purified water tank 11 is installed, for example, at a position below the sea surface in the side wall of the electric power generating ship GS illustrated in FIG. 2, so that the purified water stored in the low-temperature purified water tank 11 and the seawater are arranged for heat exchange. Accordingly, the electric power generating ship GS is arranged on the water with which the heat exchange is performed on the purified water stored in the low-temperature purified water tank 11.

Incidentally, according to the present embodiment, the description has been given of a case where the water subject to the heat exchange with the purified water stored in the low-temperature purified water tank 11 is seawater and the electric power generating ship GS is located on the sea. However, the present embodiment is not limited to this. That is, for example, the water subject to the heat exchange with the purified water stored in the low-temperature purified water tank 11 may be water on a river, and the electric power generating ship GS may be located on a river. The point is that the water subject to the heat exchange with the purified water stored in the low-temperature purified water tank 11 may be at least one of the seawater and surface water.

Moreover, according to the present embodiment, as illustrated in FIG. 1, the description has been given of a case where the shape of the low-temperature purified water tank 11 is a spherical one, as an example. However, the shape of the low-temperature purified water tank 11 is not limited to this. In other words, the shape of the low-temperature purified water tank 11 may be a box shape such as a cuboid or the like. Also, the low-temperature purified water tank 11 may have a shape having a fin at a position in contact with water subject to heat exchange with the purified water stored therein, so that the contact area with water subject to heat exchange with the purified water stored therein is increased.

The inverse osmotic pressure sea water purifying device 12 is mounted inside the electric power generating ship GS, and generates a large amount of purified water that is a main medium for energy generation in the electric power generating ship GS, from seawater (as indicated by "Sea Water" in FIG. 1). Then, the inverse osmotic pressure sea water purifying device 12 supplies the low-temperature purified water tank 11 with the generated purified water as necessary. The technique for generating the purified water from the seawater is a known technique, so the description thereof will be omitted.

The purified water supplied from the inverse osmotic pressure sea water purifying device 12 to the low-temperature purified water tank 11 is filled from the low-temperature purified water tank 11 through the pipe arrangement in the electric power generating ship GS to the solar heat storage multilayer warm-keeping tank 6, the medium-temperature water tank 7, the medium-temperature water tank 8 and the high-temperature heat storage tank 10, in the initial preparatory stage of power generation.

The initial stage power unit 13 supplies power (indicated by "AC Power Supply" in FIG. 1) such as electric power or the like necessary for power generation after the superheated steam generator according to the present invention operates, to each pump (indicated by "pump" or "Comp. Pump" in FIG. 1).

The first heat exchanger 14 and the second heat exchanger 15 are interposed between the solar heat storage multilayer warm-keeping tank 6 and the zeolite boiler system 16. Additionally, the first heat exchanger 14 and the second heat exchanger 15 change the temperatures of water, air and oil that are energy carrying media flowing between the solar heat storage multilayer warm-keeping tank 6 and the zeolite boiler system 16. The configuration of the zeolite boiler system 16 and that of the water supply device 17 will be described later.

The vapor turbine 18 is provided in the AC dynamo 20, and is driven by the high-temperature and high-pressure superheated steam output from the multilayer warm-keeping storage tank 9 to cause the AC dynamo 20 to generate a necessary output power.

The condenser 19 recovers low-pressure moisture vapor returned from the vapor turbine 18 as water having a medium temperature (medium-temperature water), and causes such recovered medium-temperature water to flow back to the zeolite solid boiler 16 again via the medium-temperature water tank 7 and the medium-temperature water tank 8.

The above medium-temperature water is circulated to rotate "flywheel cycle" among the zeolite solid boiler 16, the multilayer warm-keeping storage tank 9, and the vapor turbine 18, and stores energy like a mechanical flywheel.

Also, since the high-temperature water stored in the solar heat storage multilayer warm-keeping tank 6 stores solar heat, the energy corresponding to the power output is added to the above-described flywheel cycle via the zeolite solid boiler 16.

The AC dynamo 20 is a vapor turbine generator provided with the vapor turbine 18, as described above. The transformer/AC-DC inverter 21 outputs the power generated by the AC dynamo 20 from the power connection unit 22 of the electric power generating ship GS, as ultrahigh-voltage DC power for electric energy transmission (indicated by "Elect. Power out" in FIG. 1). In this situation, the electric power generating ship GS is installed in a continental shelf having a water depth approximately 200 meters, in a relatively long distance from the coast. Therefore, in order to transmit the power for a long distance in an efficient manner, the ultrahigh-voltage DC power output is necessary.

Therefore, according to the present embodiment, in the seawater where the electric power generating ship GS is located, a high-voltage transmission line is connected by an unmanned power connection unit 22 with the use of a robot.

Now, the outline configuration of the power connection unit 22 for connecting a high-voltage transmission line with the use of a robot will be described with FIG. 8, also with reference to FIG. 1 and FIG. 2.

Specifically, in FIG. 8, the reference numeral 22-1 represents a high-voltage power end circuit portion (indicated by "Con." In FIG. 1), the reference numeral 22-2 represents a high-voltage power end sealed chamber, and the reference numeral 22-3 represents a power connecting terminal on the electric power generating ship GS side. Likewise, the reference numeral 22-4 represents a dry air generator (indicated by "Air" in FIG. 1) for removing the seawater in the high-voltage power end sealed chamber 22-2, the reference numeral 22-5 represents an in-water power capsule, and the reference numeral 22-6 represents an in-water power cable. In addition, the reference numeral 22-7 represents a capsule anchoring unit for anchoring the in-water power capsule, and the reference numeral 22-8 represents an automatic feeding type of a winding reel for winding the power cable. Furthermore, the reference numeral 22-9 represents a power connection cable between an in-water high-voltage terminal and the winding reel 22-8, the reference numeral 22-10 represents an in-water high-voltage terminal, and the reference numeral 22-11 represents an in-water electric power tower. Moreover, the reference numeral 22-12 represents an in-water electric power tower base, the reference numeral 22-13 represents an in-water installed power cable, the reference numeral 22-14 represents a connection robot for self-propelled power connection, and the reference numeral 22-15 represents a remote control arm provided in the connection robot 22-14.

The power connection unit 22 is a device for transmitting the high-voltage DC power with few loss by the generation on the ocean, which is generated by the electric power generating ship GS, to an on-land consumption site at a distance. The high-voltage power end circuit portion 22-1 is a power transmitting terminal of the electric power generating ship GS. The high-voltage power end sealed chamber 22-2 is installed on the ship bottom of the electric power generating ship GS, and stores a terminal for connection.

Figures 8A, 8B:
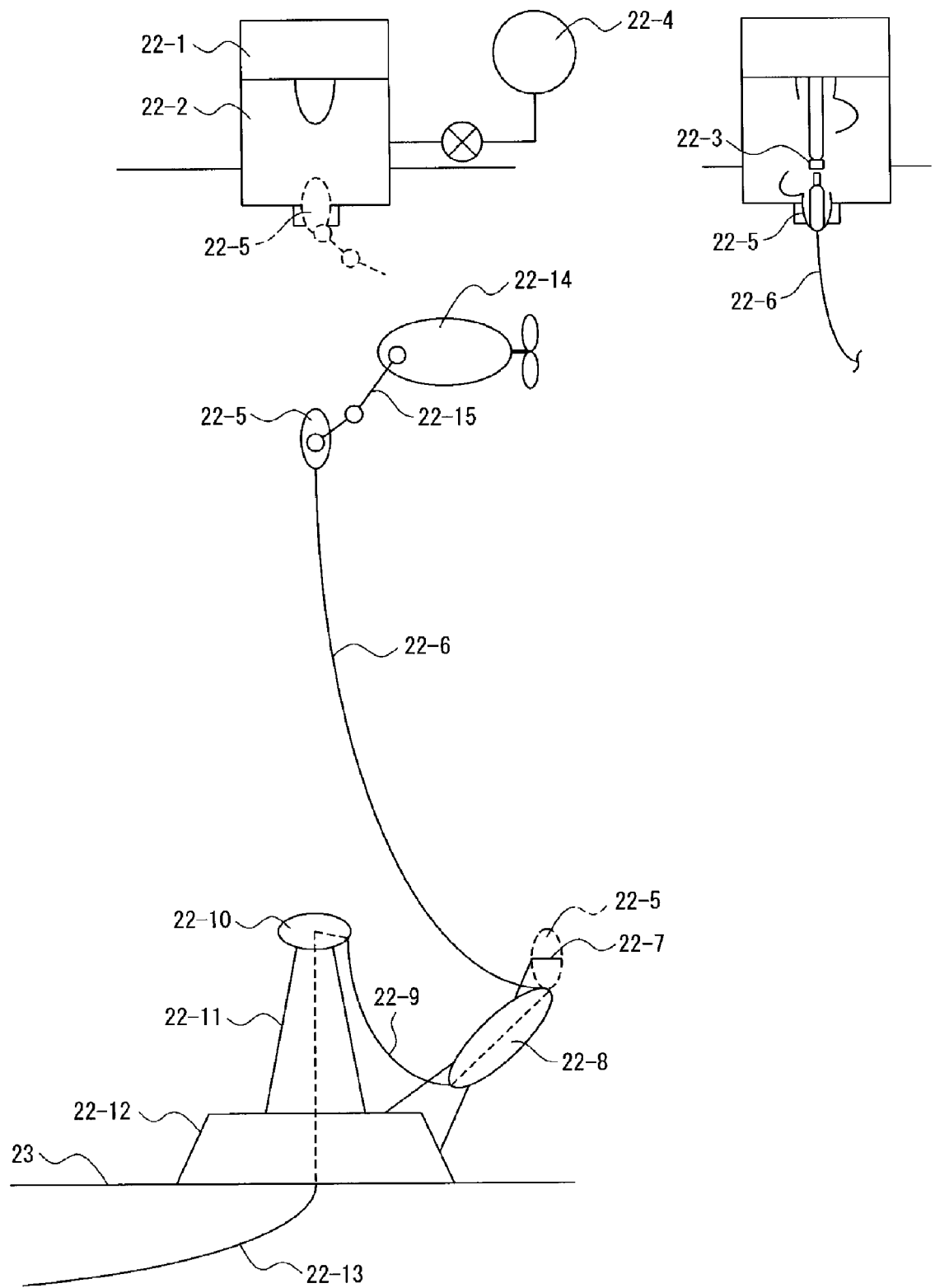
FIG. 8A is a view illustrative of the whole configuration before the high-voltage transmission line is connected.
FIG. 8B is a view illustrative of the state in a high-voltage power end sealed chamber in the event of connecting the high-voltage transmission line.

The in-water power capsule 22-5 includes therein a terminal of the in-water power cable 22-6. Also, the in-water power capsule 22-5 is accommodated in the inside of the high-voltage power end sealed chamber 22-2 with the high-voltage transmission line connected, as illustrated in FIG. 8B.

The in-water high-voltage terminal 22-10 is a terminal of the in-water installed power cable 22-13, and is installed in the water. The in-water installed power cable 22-13 is a cable installed, by the in-water electric power tower 22-11 and the in-water electric power tower base 22-12, at the bottom of water allowed to be subject to heat exchange with the purified water stored in the low-temperature purified water tank 11, namely, at the sea bottom.

The connection robot 22-14 is a small-sized remote control robot for electrically coupling the high-voltage power end circuit portion 22-1 and the in-water installed power cable 22-13 installed at the sea bottom.

In addition, the connection robot 22-14 is used for transporting the in-water power capsule 22-5 after removing the in-water power capsule 22-5 from the capsule anchoring unit 22-7 that retains the in-water power capsule 22-5 at the sea bottom, in the state prior to the connection of the high-voltage transmission line.

Furthermore, the connection robot 22-14 is provided with a remote control arm 22-15 and a monitoring TV (not illustrated). Then, the remote control arm 22-15 is operated from the electric power generating ship GS on the sea by referring to images on the monitoring TV so as to handle the in-water power capsule 22-5. Incidentally, in FIG. 8A, the in-water power capsule 22-5 and the remote control arm 22-15 are indicated by solid lines in the state prior to the connection of the high-voltage transmission line. Meanwhile, in FIG. 8A, the in-water power capsule 22-5 and the remote control arm 22-15 are indicated by dotted lines in the state subsequent to the connection of the high-voltage transmission line.

That is to say, the remote control arm 22-15 provided in the connection robot 22-14 is an arm for connecting the in-water power cable 22-6 arranged in the water subject to heat exchange with the purified water stored in the low-temperature purified water tank 11 to a terminal of the in-water installed power cable 22-13.

The operation of the power connection unit 22 will now be described, with the operation for connecting the high-voltage transmission line described first.

In connecting the high-voltage transmission line, as illustrated in FIG. 8A, the in-water power capsule 22-5 is secured to the high-voltage power end sealed chamber 22-2 at the sea bottom, and then the seawater in the high-voltage power end sealed chamber 22-2 is removed. After that, the high-voltage power end sealed chamber 22-2 is washed with purified water, and the dry air supplied from the dry air generator 22-4 removes moisture remaining in the power connection unit 22.

Subsequently, as illustrated in FIG. 8B, the lid of the in-water power capsule 22-5 is opened and the protection lid of the power connecting terminal 22-3 is also opened, an automatic power combiner (not illustrated) configured therein couples the power connecting terminal 22-3 and the terminal of the in-water power capsule 22-5 with an electric connector (not illustrated). Then, after the coupling of the power connecting terminal 22-3 and the terminal of the in-water power capsule 22-5 is confirmed, the transmission of high-voltage power (indicated by "Elect. Power out" in FIG. 1) starts.

Next, the operation in releasing the connection of the high-voltage transmission line will be described. In releasing the connection of the high-voltage transmission line, the above procedure is reversely performed. Also, the connection robot 22-14 is accommodated in the electric power generating ship GS unless it is used. In this situation, the in-water electric power tower 22-11 for high-voltage power connection and the winding reel 22-8 for accommodating the power connection cable 2-9 are installed beforehand at the sea bottom. Incidentally, the winding reel 22-8 and the in-water electric power tower 22-11 are, for example, managed by an onshore energy transfer and distribution establishment that receives the power energy.

Moreover, when the high-voltage transmission line is connected or released, the electric power generating ship GS is anchored near the in-water electric power tower 22-11 or sails at a low speed with unanchored, and the power generating operation is performed while controlling the position and the direction by means of information such as a gyrocompass, GPS, or the like. In this situation, the place should be selected to have an enough depth in the sea so that the electric power generating ship GS is submersible to allow the in-water power cable 22-6 to reach the sea bottom.

Next, the configuration of the zeolite boiler system 16 and the configuration of the water supply device 17 will be described with FIG. 9, FIG. 10, and FIG. 11, also with reference to FIG. 1 and FIG. 2.

The zeolite solid boiler 16 serves as the heart of the superheated steam generator, and is a zeolite boiler system. The heart of the zeolite boiler system is composed of multiple zeolite cartridges 16-1 attached at a furnace body 16-3. Each of the zeolite cartridges 16-1 is composed of, in a cylindrical cartridge container, multiple zeolites arranged in the axial direction of the container spaced from each other in multiple layers and multiple levels (for example, see Japanese Utility Model Registration Number 3094574 Y). This configuration allows moisture or water mist to freely pass through each of the zeolite cartridges 16-1.

Specifically, the zeolite cartridges 16-1 are inserted into multiple cylinders 16-2 arranged at the furnace body 16-3, respectively, as illustrated in FIG. 10A. Therefore, each cylinder 16-2 functions as an attaching holder of the zeolite cartridge 16-1. The furnace body 16-3 is accommodated between a furnace chamber lower portion 16-4 and a furnace chamber upper portion 16-5 in the inside of the zeolite solid boiler 16.

Furthermore, there are provided multiple furnace bodies 16-3 in the zeolite solid boiler 16. However, according to the present embodiment, a description will be given of a case where the zeolite solid boiler 16 includes 12 furnace bodies 16-3 as an example, as illustrated in FIG. 10B.

Such 12 furnace bodies 16-3 are formed of two pairs including a first furnace body line and a second furnace body line, each including six furnace bodies. The first furnace body line and the second furnace body line are arranged to oppose each other.

The furnace bodies in the first furnace body line are respectively connected to each other by a pipe arrangement 16-8, whereas the furnace bodies in the second furnace body line are respectively connected to each other by a pipe arrangement 16-10.

Specifically, some of multiple furnace bodies 16-3 form the first furnace body line in which multiple furnace bodies 16-3 are connected by the pipe arrangement 16-8, whereas the other multiple furnace bodies 16-3 that do not form the first furnace body line form the second furnace body line in which multiple furnace bodies 16-3 are connected by the pipe arrangement 16-10.

Accordingly, in the following description, the first furnace body line is denoted by the line formed by six furnace bodies 16-3 on the lower side of the FIG. 10B, whereas the second furnace body line is denoted by the line formed by six furnace bodies 16-3 on the upper side of the FIG. 10B.

The first furnace body line and the second furnace body line alternately switch the adsorption process and the desorption process of water for zeolite. Incidentally, FIG. 10A and FIG. 10B illustrate the state where the first furnace body line is switched to the adsorption process and the second furnace body line is switched to the desorption process. That is, FIG. 10A and FIG. 10B illustrate the state where the first furnace body line is switched by a desorption heater to an adsorbing furnace body line in which zeolite adsorbs moisture and the second furnace body line is switched to the desorbing furnace body line in which zeolite desorbs moisture.

Specifically, while each of the furnace bodies in the first furnace body line is adsorbing moisture, each of the furnace bodies in the second furnace body line is desorbing moisture, whereas while each of the furnace bodies in the second furnace body line is adsorbing moisture, each of the furnace bodies in the first furnace body line is desorbing moisture.

In the following, the operation relating to the absorption and desorption processes of the first furnace body line and the switch control will be described with reference to FIG. 10A and FIG. 10B. However, the operation relating to the absorption and desorption processes of the second furnace body line is same as those of the first furnace body line, so the description will be omitted.

Firstly, the absorption operation of the first furnace body line will be described. In the absorption operation of the first furnace body line, vapor or mist of approximately 30° C. is adsorbed onto the zeolite of the zeolite cartridge 16-1 attached to the furnace body 16-3. The vapor or mist of approximately 30° C. is supplied from the water supply device 17 illustrated in FIG. 1 and FIG. 11 and is then adsorbed onto the zeolite in the zeolite cartridge 16-1 via the pipe arrangement 16-8 and an electromagnetic valve 16-01.

The moisture (vapor) adsorbed onto the zeolite in the zeolite cartridge 16-1 remains in the zeolite cartridge 16-1 with heated. Additionally, the dry air with an increased temperature and excessive water particles that pass through the gaps in the zeolite holder (in the cartridge) are fed to a third heat exchanger 17-2 via the furnace chamber upper portion 16-5, an electromagnetic valve 16-04, and the pipe arrangement 16-10.

The thermal energy of the heated mixture gas (dry air and excessive water particles) fed to the third heat exchanger 17-2 is subject to heat exchange with the coolant water introduced into the third heat exchanger 17-2 by means of the third heat exchanger 17-2. The heated water subsequent to the heat exchange with the coolant water introduced into the third heat exchanger 17-2 is fed to the medium-temperature water tank 7 and the medium-temperature water tank 8.

In this situation, the heated air that has decreased its temperature to room temperature by the heat exchange with the coolant water introduced into the third heat exchanger 17-2 is exhausted to the air from the third heat exchanger 17-2.

Next, the desorption process of the first furnace body line will be described.

In the desorption process of the first furnace body line, the electromagnetic valve 16-01 and the electromagnetic valve 16-4 are closed, although they are opened in the operation of the above-described adsorption process, and an electromagnetic valve 16-02 and an electromagnetic valve 16-03 are opened. Then, the dry air generated by an air blower 16-6 is fed to the zeolite in the zeolite cartridge 16-1 attached to A line of the furnace body 16-3 via the pipe arrangement 16-9 and the electromagnetic valve 16-02.

In this manner, zeolite that adsorbs water emits vapor moisture with high temperatures (150 to 200° C., 1 atm≈0.1 MP), and simultaneously crystal cavities thereof are dried. At the time of desorption, the moisture vapor that comes out of the first furnace body line (the furnace chamber upper portion 16-5) to the furnace chamber upper portion is pressurized and increased in temperature by the nonadiabatic pressure pump 16-7. Additionally, the high-temperature water (80 to 100° C.) fed from the solar heat storage multilayer warm-keeping tank 6 illustrated in FIG. 1 heats the air via the first heat exchanger 14. Furthermore, the air subsequent to heat exchange with the high-temperature water produced by the moisture vapor is heated by compressing with a heat insulating pressure pump (a pressure pump interposed between the first heat exchanger 14 and the second heat exchanger 15).

Then, the heated air compressed by the heat insulating pressure pump is subject to the heat exchange with an oil-based medium having a high specific heat 150 to 200° C. Also, the moisture vapor (inside of the zeolite cartridge 16-1 is heated) in the zeolite cartridge 16-1 is heated to 150 to 200° C. by a heat exchange coil provided in the zeolite cartridge 16-1. Accordingly, the heat exchange coil provided in the zeolite cartridge 16-1 corresponds to a desorption heater that heats the zeolite by desorbing the water molecules adsorbed onto the zeolite.

As described above, when the zeolite that has adsorbed water is heated to 150 to 200° C. as illustrated in a system diagram of the zeolite solid boiler 16 illustrated in FIG. 10, the furnace chamber upper portion 16-5 is filled with superheated steam. Such filled superheated steam is fed to the nonadiabatic pressure pump 16-7 via the electromagnetic valve 16-03 and the pipe arrangement 16-11.

When the nonadiabatic pressure pump 16-7 operates, the superheated steam filled in the furnace chamber upper portion 16-5 is pressurized and increased in temperature (in the state of superheated steam, for example, 450° C., 3 MPa), and is then stored in the multilayer warm-keeping storage tank 9. Thus, the superheated steam is generated.

In this manner, the vapor emitted from the zeolite solid boiler 16 is pressurized and increased in temperature in the nonadiabatic pressure pump 16-7. Specifically, according to the present embodiment, a description will be given of an example in which the temperature is increased to approximately 450° C. by the nonadiabatic pressure pump 16-7 and the pressure is approximately 3 Mp.

Then, from the heat waste generated in the compression process, the energy is recovered in the process of heating the coolant water, and is reproduced to steam energy at a solid boiler again via the solar heat storage multilayer warm-keeping tank 6 and the high-temperature heat storage tank 10. The high-pressure (approximately 3 Mp) and high-temperature (approximately 450° C.) steam is stored in the multilayer warm-keeping storage tank 9 having three-layered warm keeping jacket.

Next, the configuration of the reaction switching control device 16C-1 will be described with FIG. 12, also with reference to FIG. 1, FIG. 2, FIG. 9, FIG. 10, and FIG. 11. The reaction switching control device 16C-1 is a device for controlling valve switching, in alternately performing the adsorption process and the desorption process of the zeolite solid boiler 16. Incidentally, in the valve switching control, in addition to the adsorption process and the desorption process, the whole superheated steam generator according to the present invention will be controlled, including the water amounts, water temperatures, and the like of the medium-temperature water tank 7, the medium-temperature water tank 8, the solar heat storage multilayer warm-keeping tank 6, the multilayer warm-keeping storage tank 9, and the high-temperature heat storage tank 10.

Referring to FIG. 9, devices arranged in the periphery of the zeolite solid boiler 16 are provided with temperature sensors TS, respectively. In detail, the devices arranged in the periphery of the zeolite solid boiler 16 are the solar heat storage multilayer warm-keeping tank 6, the medium-temperature water tank 7, the medium-temperature water tank 8, the multilayer warm-keeping storage tank 9, the high-temperature heat storage tank 10, the low-temperature purified water tank 11, and the water supply device 17.

Like each of the above devices, the zeolite solid boiler 16 is also provided therein with a temperature sensor TS for sensing the temperature of the furnace body 16-3 (the first furnace body line and the second furnace body line) of the zeolite solid boiler 16 and the temperature of zeolite. To be specific, this temperature sensor TS is installed in the zeolite cartridge 16-1. Therefore, the temperature measured by each temperature sensor is input into the reaction switching control device 16C-1 (indicated by "temperature input from each TS" in the drawing).

Figure 12:
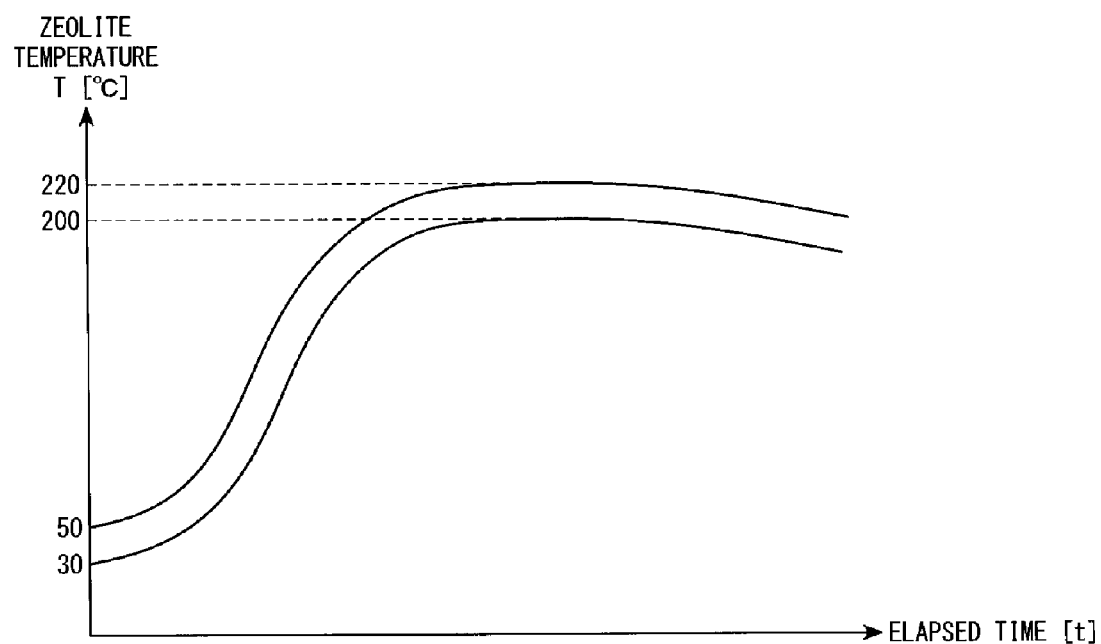
FIG. 12 is a typical graph showing the relationship of the temperature of zeolite in a zeolite cartridge and the elapsed time in one cycle from the time when the adsorption process starts to the time when the desorption process ends.

FIG. 12 is a graph showing the relationship of the temperature T ° C. of zeolite in the zeolite cartridge 16-1 and the elapsed time in one cycle from the time when the adsorption process starts to the time when the desorption process ends. In addition, in FIG. 12, the vertical axis represents the temperature T ° C. of zeolite, whereas the horizontal axis represents the elapsed time t. Furthermore, the graph illustrated in FIG. 12 exemplifies a case where one cycle from the time when the adsorption process starts to the time when the desorption process ends is set to two hours.

Herein, the time when the adsorption process starts is the time when the moisture vapor or mist is supplied to the zeolite in the zeolite cartridge 16-1 and water starts to be adsorbed onto the zeolite. According to the present embodiment, a description will be given of a case where the temperature of the zeolite at the time when the adsorption process starts is approximately 30° C. (indicated by "30" in the vertical axis).

Figure 11:
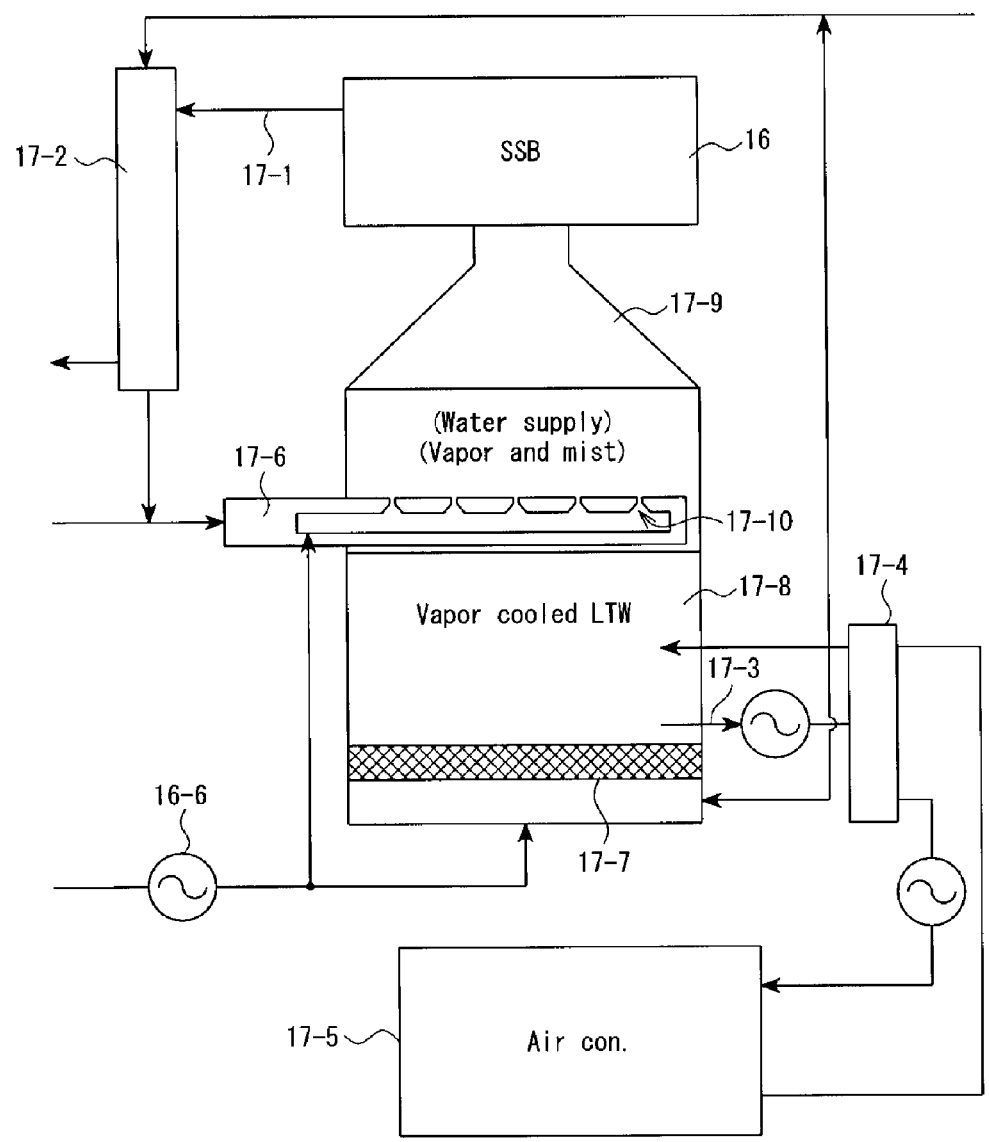
FIG. 11 is a view illustrative of the outline configuration of a water supply device.

Moreover, in the state where the adsorption process starts, as illustrated in FIG. 11, purified water obtained by the inverse osmotic pressure sea water purifying device 12 from seawater is made to have a form of mist by the air blower 16-6. Then, the vapor in the form of mist is mixed with the heated water (30 to 50° C.) supplied from the medium-temperature water tank 7 and the medium-temperature water tank 8, and is then supplied to the zeolite solid boiler 16 as vapor or mist of 30° C.

When the temperature of the zeolite becomes near 30° C., the reaction switching control device 16C-1 activates the air blower 16-6 of the water supply device 17 to start the adsorption process.

Then, when the zeolite in the zeolite cartridge 16-1 attached to the furnace body 16-3 adsorbs mist of about 30° C., the temperature of the zeolite temporarily drops. However, since the zeolite that temporarily drops its temperature is heated by far infrared rays emitted by absorption of water in the zeolite, the temperature does not drop drastically and increases over time.

In this situation, the energy transfer mechanism occurring when water is changed to superheated steam by the heat generated by the zeolite includes the heat transfer using a chemical exothermic agent such as CaO as described above and the heat transfer of radiation heat energy of far infrared rays. For this reason, it is possible to perform heat transfer with a quick reaction and high efficiency.

When the operation of the adsorption process starts, the reaction switching control device 16C-1 opens the electromagnetic valve 16-01 and the electromagnetic valve 16-04 based upon the signal from the temperature sensor TS in the zeolite cartridge 16-1, and then closes the electromagnetic valve 16-2 and the electromagnetic valve 16-03.

When the adsorption of water into zeolite in the zeolite cartridge 16-1 starts, the temperature in the zeolite cartridge 16-1 rises over time with an upward-sloping curve, as illustrated in FIG. 12. After that, the temperature in the zeolite cartridge 16-1 exceeds 100° C., the superheated steam starts to be filled in the furnace chamber upper portion 16-5.

At this time, the reaction switching control device 16C-1 continuously controls starting of supply of an oil-based medium to the heat exchange coil, so that the energy stored by use of solar heat (see FIG. 1) heats the cartridges (zeolite) in the first furnace body line to 150 to 200° C.

Subsequently, when the (room) temperature of the superheated steam of the furnace chamber upper portion 16-5 reaches the preset temperature (for example, 200° C.), the reaction switching control device 16C-1 closes the electromagnetic valve 16-01 and electromagnetic valve 16-4 for water mist, while activating the air blower 16-6, so as to control opening of the electromagnetic valve 16-02 and the electromagnetic valve 16-03. In addition to this, the reaction switching control device 16C-1 operates the nonadiabatic pressure pump 16-7, and supplies the superheated steam output from the nonadiabatic pressure pump 16-7 (for example, 450° C., 3 MPa) to the vapor turbine 18 that is an output utilization source.

In this situation, the control performed by the reaction switching control device 16C-1 is not the control of supplying the superheated steam output from the nonadiabatic pressure pump 16-7 to the vapor turbine 18 promptly. To be specific, the superheated steam is stocked in the multilayer warm-keeping storage tank 9 as a high-temperature and high-pressure gas for several hours. Then, the supply of such stocked superheated steam to the vapor turbine 18 is controlled via a control valve (not illustrated) for opening and closing the high-temperature and high-pressure superheated steam outlet 9-12.

Incidentally, the output of the superheated steam output from the nonadiabatic pressure pump 16-7 is not limited to the vapor turbine 18. For example, an external vapor turbine power generator or a heat exchanger may serve as the output.

Subsequently, when the operation of the above-described desorption process continues, the superheated steam adsorbed onto the zeolite decreases. The temperature of zeolite releasing adsorption of water supplied from the water supply device 17 is dropping in accordance with a temperature curve illustrated by a graph of FIG. 12. Once this temperature dropping state starts, the reaction switching control device 16C-1 stops the supply of the oil-based medium to the heat exchange coil. When the supply of an external energy to the zeolite cartridge 16-1 by means of the oil-based medium is shut off, the temperature in the zeolite cartridge 16-1 drops according to natural heat radiation as illustrated in FIG. 12.

Incidentally, in a state where the temperature in the zeolite cartridge 16-1 drops according to the natural heat radiation, after the temperature of zeolite drops to the temperature prior to the adsorption start, the above adsorption process may be started again.

Also, according to the temperature curve illustrated in FIG. 12, after zeolite reaches 200° C. and the elapsed time indicated by the horizontal line finishes desorption at a time when, for example, two hours has passed since the start of adsorption, the zeolite cartridge 16-1 may be caused to control the start of adsorption again.

Next, a description will be given of the outline of the process of generating the superheated steam by means of a zeolite boiler system provided in the superheated steam generator according to the present invention.

Zeolite is a silicate chemical compound, and its chemical composition is general expression $xM_{2n}O \cdot Al_2O_3 \cdot ySiO_2 \cdot zH_2O$ (where x, y, and z are coefficients, and M denotes an n-valent metal such as Na or the like). The crystal structure of zeolite has a three-dimensional mesh structure aligned in the order of Å (Angstrom) having a micropore diameter almost as small as molecular size. Additionally, zeolite can be used in a natural mineral. Meanwhile, zeolite is a pumice stone that can be used even if it is made from an artificial composition.

Furthermore, zeolite is a material generally called boiling stone. Simply put, zeolite is a stone having multiple openings like a bamboo basket. There is a feature that various molecules are put into multiple openings of zeolite. As a general use, zeolite is used as a molecular sieve such as for water purification. When water is input into the openings of the crystal structure of zeolite and adsorbed therein, zeolite produces heat. When zeolite that adsorbs a large amount of water is heated up from the outside, in other words, when zeolite is desorbed, moisture vapor is generated.

Specifically, when the molecules of water (water molecules) are adsorbed onto zeolite and heated up, water molecules are taken into uniform fine pores in the crystal. This is to say, when the water molecules are adsorbed onto zeolote and heated up, the water molecules are taken in zeolite in accordance with the sizes of uniform fine pores in the unit of Å.

In this phenomenon, water molecules are taken into fine pores in an elastic energy. Accordingly, the desorption of water molecules from zeolite occurred by heating up water molecules adsorbed onto zeolite is performed by releasing the elastic energy taken in the fine pores at the time of adsorbing water molecules.

Therefore, when the water molecules are desorbed from zeolite, it is possible to obtain superheated steam of monomolecular $H_2O$, which is not an multimolecular $H_2O$ cluster and which is composed in the state of uniform water molecules in accordance with the sizes and distribution of fine pores of zeolite.

In this manner, according to the present invention, it is made possible to produce superheated steam by repeating the water adsorption process and desorption process. The superheated steam generated by the adsorption process and desorption process has a heat efficiency higher than the superheated steam produced by directly boiling water. It is therefore possible to use the zeolite solid boiler 16 as a solid boiler in an efficient manner.

The reason why such high heat efficiency is available will be described as follows. That is to say, the fine pores in the crystal structure of zeolite are aligned in the size of order in the unit of Å almost as small as the sizes of molecules. This is the reason for use in molecular sieve (for example, see "Chemical Handbook Applied Chemistry II Substance Edition H2.7.15 The Third MARUZEN"). Thus, when the moisture vapor is transformed into electric power by the vapor turbine or when heat exchange is performed with another heat medium, it is possible to use as an energy heat source (molecular state) with the distribution of more uniform molecular sizes. This is the reason why such high conversion efficiency is achieved.

As a heat pump material similar to the above-described zeolite, there is a chemical relationship of reversible reaction occurring when the moisture vapor is made available by reacting calcium oxide with water. Such a chemical relationship of reversible reaction is shown as follows:

$$CaO+H_2O \rightleftharpoons Ca(OH)_2+15.2 \text{ kcal/Mol}$$

(for example, see "Chemical Handbook Applied Chemistry II Substance Edition H2.7.15 The Third MARUZEN")

In the above formula, water molecules are taken into gaps between crystals of CaO, but the sizes of theses gaps depend on the size of crystal particles of calcium oxide. Accordingly, when the water molecules are heated from this state and the water molecules are vaporized, the moisture vapor merely results in having a size of water molecule when taken in and also having a distribution of a multimolecular size corresponding to the state of the gaps of crystal particles. That is to say, since the crystal particles of usual calcium oxide are great and are not uniform, it is impossible to obtain moisture vapor having a size of uniform water molecule order like zeolite. This applies to the chemical relationship of reversible reaction of a noncrystalline material such as silica gel or the like used as a general absorbent material.

As described heretofore, the fine pores of zeolite are uniform, and in addition, have a micropore diameter of molecule order. For this reason, capturing of water molecules at the time of adsorbed on or desorbed by zeolite is performed by stocking and releasing action of elastic energy with these fine pores, thereby enabling the production of superheated steam having a uniform energy distribution dependent on the water molecules. Accordingly, in the energy conversion with the use of the superheated steam obtained by the above procedure, a high efficient energy conversion is made possible as compared to the conversion with the use of any material obtained by another chemical exothermic reaction.

Moreover, the water-absorbing property of zeolite together with the air blower 16-6 trigger evaporation of water in the water supply device 17 (specifically, purified water stocked in the lower level of a mist filter 17-7 illustrated in FIG. 11), as will be described later, latent heat of water is inevitably absorbed or removed. As a result, the water in the water supply device 17 becomes to have a temperature lower than the low-temperature purified water tank 11, and its low-temperature water returns to the low-temperature purified water tank 11 by way of the pipe arrangement to open an energy supply passage from the seawater to the low-temperature purified water tank 11. In other words, the lowered temperature of water in the water supply device 17 exhibits the use for the power generation energy.

Next, a description will be given of the outline configuration of the water supply device 17 and the operation of taking the seawater energy source in the superheated steam generator according to the present invention. The water supply device 17 is a device for supplying moisture vapor of approximately 30° C. (specifically 30 to 55° C.) in the shape of vapor or mist to the zeolite solid boiler 16. The water supply device 17 is provided with a cold moisture vapor chamber 17-8 of a lower level, a mist generator 17-6 of a middle level, and a moisture vapor chamber 17-9 of an upper level.

The cold moisture vapor chamber 17-8 is bidirectionally coupled to the low-temperature purified water tank 11, and a certain amount of purified water is supplied from the inverse osmotic pressure sea water purifying device 12 via the low-temperature purified water tank 11 (as indicated by "Pure Water" in FIG. 1). Then, the cold moisture vapor chamber 17-8 stocks the supplied purified water, and is capable of supplying the purified water to the lower portion of the mist filter 17-7 in accordance with the supplied amount to the zeolite solid boiler 16 from the water supply device 17.

The cold moisture vapor chamber 17-8 also separates the purified water and mist by use of the mist filter 17-7, having numerous fine pores, made of a glass material, for example (may be a corrosion-resistant material such as ceramic, resinous material, and the like), in accordance with the particle size of the mist.

The mist generator 17-6 introduces moisture vapor in the cold moisture vapor chamber 17-8 and MTW thereinto for heat exchange to produce vapor or mist of 30 to 55° C. (hereinafter, "vapor or mist" will be referred to as "mist" in some cases).

As illustrated in FIG. 11, the mist generator 17-6 is provided with a mist generation cavity 17-10 having fine pores same as those of the mist filter 17-7, surrounded by the circulating passage of MTW, and independent. The moisture vapor chamber 17-9 makes the mist produced by the mist generator 17-6 uniform, and then introduces the mist to the zeolite solid boiler 16.

Subsequently, the latent heat energy of vaporization is lost in the process of vaporizing moisture from the mist supplied to the zeolite solid boiler 16, the temperature of water in the evaporation tank is decreased, and an air-conditioner 17-5 (as indicated by "Air Con" in FIG. 1) is activated via a fourth heat exchanger 17-4. This is used for adjusting the temperature of the electric power generating ship, in particular, an electric power generating worksite.

That is, the upper level side of the mist filter 17-7 is in the state of water mist of vapor. Meanwhile, the lower level side of the mist filter 17-7 is filled with a certain amount of purified water introduced from the low-temperature purified water tank 11 and successive refill of the purified water from the low-temperature purified water tank 11 is controlled so as to maintain a certain amount.

The mist generation cavity 17-10 makes MTW to the state of mist, and then mixes MTW in the state of mist with the mist produced by the mist filter 17-7, so as to supply warm mist to the moisture vapor chamber 17-9. In addition to this, the mist generation cavity 17-10 has a function of adjusting and finally stabilizing the size of the mist supplied to the moisture vapor chamber 17-9 by adjusting the size of the mist generating cavity.

In this state, in order to generate mist in which the seawater energy source is taken in by the water supply device 17, the air blower 16-6 illustrated in FIG. 10 blows clean air to the purified water stocked in the lower level of the mist filter 17-7. At the same time, the mist generation cavity 17-10 of the mist generator 17-6 of the middle level is subject to this air blow.

This air blow makes the purified water stocked in the lower level of the mist filter 17-7 be water mist while the purified water is passing through the fine pores of the mist filter 17-7. However, in the generation of this mist, the latent heat of vaporization of the purified water in the lower level is lost by the mist. Thus, the temperature of the purified water stocked in the lower level of the mist filter 17-7 becomes almost as low as that of the purified water stocked in the low-temperature purified water tank 11 that is the temperature of seawater.

The difference in temperature generated here is estimated to be lower by approximately 5° C. than the temperature of seawater, and energy is taken into a certain amount of purified water with a lower temperature stocked in the lower level of the mist filter 17-7 of the water supply device 17 from the seawater side with a higher temperature in accordance with the second law of thermodynamics. This suppresses the decrease in the temperature of water supplied from the water supply device 17 to the zeolite solid boiler 16. Specifically, the consumed energy is resupplied from the seawater side.

In fact, the heat energy of seawater is not merely taken by the heat exchange with seawater that has variations in temperature throughout the year. A low-temperature source, with temperatures lower than those of seawater, generated by the continuous operation of an electric power generation system is produced on a certain amount of purified water side of the lower level of the mist filter 17-7. This necessitates taking of the heat energy of seawater having variations in temperature.

As described heretofore, the mist-state moisture adsorbed onto the zeolite for heating the zeolite enables the seawater source energy to be take into the superheated steam generator in the end.

Accordingly, the air blower 16-6 and the mist filter 17-7 correspond to an atomization device for generating moisture in the state of mist from the purified water supplied to the water supply device 17. Also, the atomization device makes the temperature of purified water supplied to the water supply device 17 from the low-temperature purified water tank 11 lower than the temperature of water subject to the heat exchange with the purified water stocked in the low-temperature purified water tank 11, by use of latent heat of vaporization occurring when the mist-state moisture is generated.

Specifically, the whole out of the energy that the superheated steam generator according to the present invention can actually output as for an energy utilization source such as a vapor turbine or the like, the most part of the energy amount is given by the sum of a seawater energy source Qws that has an energy source from seawater and a solar energy source Qin that has an energy from the sun.

Herein, the energy that can be actually output of an energy utilization source such as a vapor turbine or the like will be denoted by a formula (16), as will be described later, as energy Qout (the entire system output).

$11/12$ of the energy Qout is estimated to be the seawater energy source. For this reason, even if the solar energy source Qin is 0, the superheated steam generator will be capable of supplying energy in a stable manner to the energy utilization source such as the vapor turbine 18 or the like without deteriorating the efficiency drastically.

As illustrated in FIG. 11, the mist in the upper part of the mist filter 17-7 generated from the above-described low-temperature source is the moisture vapor having a temperature lower than that of seawater. Therefore, the air-conditioner 17-5 may be operated via the fourth heat exchanger 17-4 to be used for adjusting the temperature in the electric power generating ship GS, for example.

Hereinafter, the operation of the superheated steam generator will be described with reference to FIG. 1 to FIG. 12. Firstly, in the preparation stage before the power generation starts, purified water of normal temperature is introduced into the solar heat storage multilayer warm-keeping tank 6. In this situation, a large amount of purified water of normal temperature is introduced into the solar heat storage multilayer warm-keeping tank 6. Thus, in the estimation in consideration of the operating temperature, the purified water of normal temperature introduced into the solar heat storage multilayer warm-keeping tank 6 in this stage already has an initial energy of near 80% of the total energy.

Accordingly, the electric power generating ship GS serves as a base of collection of solar energy and supply, and also serves as the storage of purified water (fresh water).

Then, when the initial stage power unit 13 is activated, the high-temperature energy stored in the solar heat storage multilayer warm-keeping tank 6 emits high-temperature moisture vapor (1 atm≈0.1 Mp) from zeolite including water therein in the desorption process of the zeolite solid boiler 16, the zeolite crystal cavities are dried, and at the same time heat is stored in the zeolite crystals.

Also, in this desorption process, the temperature in the zeolite furnace is stabilized between 150° C. and 200° C. by the heat insulating pressure pump capable of changing the pressure interposed between the first heat exchanger 14 and the second heat exchanger 15. In the adsorption process subsequent to the desorption process, the moisture of low energy is adsorbed onto the zeolite cavities in the furnace body 16-3 provided in the zeolite solid boiler 16 by the moisture vapor and mist supplied from the water supply device 17. Meanwhile, zeolite emits energy in far infrared rays and then contracts.

Then, the energy emitted by zeolite and high-temperature air 17-1 that absorbs the energy and is used for air blow are fed into the third heat exchanger 17-2, the energy absorbed into the coolant water and regenerated is transferred thereto, and then the energy is recovered to the medium-temperature water tank 7 and the medium-temperature water tank 8.

In the above-described adsorption process and the desorption process, although the energy balance of the zeolite active substance is zero, the low-temperature water energy is emitted as high-temperature steam in the adsorption process and the desorption process. Specifically, in the above-described adsorption process and the desorption process, zeolite produces a catalytic effect in the generation of steam. In detail, zeolite functions as a solid boiler in the above-described adsorption process and the desorption process, and high-temperature water energy having a solar heat source that is fed into the solid boiler is converted to high-temperature steam.

Next, a description will be given of the relationship of energy balance occurring when the superheated steam generator according to the present invention takes in the solar heat energy source and the seawater energy source for generating the superheated steam. In a case where the actual output energy amount that the superheated steam generator according to the present invention can supply to the utilization source such as the vapor turbine 18 or the like is denoted by energy Qout (see FIG. 1), the energy Qout is calculated by the following formula (1).

$$Qout = [[Qsun - Qsunloss] + [Qz - Qzo]]Qcp' - [\text{electric system loss:} Qloss] \quad (1)$$

Herein, Qsun denotes receiving total sunlight heat energy, Qsunloss denotes an energy loss produced in the heliostat 2 when the heat energy of sunlight is received. Specifically, the value of Qsun−Qsunloss is, as defined by the formula (5) as will be described later, denotes the energy amount of the sunlight source taken into the superheated steam generator (system) and actually available in the superheated steam generator. Also, Qz denotes an energy amount generated by the adsorption of mist of water to be supplied in the zeolite boiler system. Like Qz, Qzo denotes an energy amount necessary for desorption of water mist for keeping its reversibility in the zeolite boiler system.

That is to say, Qz−Qzo denotes the energy amount generated by the zeolite solid boiler 16 and actually usable in the superheated steam generator. Also, Qcp' is a leaked energy amount of the whole energy Qcp fed to the nonadiabatic pressure pump 16-7. That is, Qcp' is energy, the most of which is recovered as HTW and MTW. In addition, Qloss denotes an inevitable loss in the electric system in the superheated steam generator. Furthermore, the energy amount of the seawater energy source input from the water supply device 17 is calculated by the following formula (2).

$$Qws + Qzo = Qz + Qz' \quad (2)$$

Herein, Qws denotes the energy amount of the seawater source that the zeolite solid boiler 16 introduces from the water supply device 17, whereas Qzo denotes the energy amount of the zeolite solid boiler 16 (with the use of the solar heat source energy). Likewise, Qz denotes the energy amount generated by the zeolite solid boiler 16, whereas Qz' denotes the energy amount recovered to MTW. Qz+Qz' has been experimentally confirmed to be 60 to 70% of Qws.

That is to say, Qz' is calculated by the following formula (3).

$$Qz' \approx Qws(60 \text{ to } 70\%) \qquad (3)$$

To put the above-described formula (2) and formula (3) together, the entire energy to be fed to the nonadiabatic pressure pump 16-7 is calculated by the following formula (4).

$$Qcp = Qin - Qzo + Qz \qquad (4)$$

In other words, the formula (4) is given by the sum of the energy amount of solar heat source Qin and the energy amount generated by the zeolite solid boiler 16 (Qz−Qzo).

Incidentally, Qcp is the entire output energy amount of the zeolite solid boiler 16 prior to the supply to the nonadiabatic pressure pump 16-7 (see Qcp'). Also, since the energy amount input into the zeolite solid boiler 16 in the formula (4) is an effective component of the energy amount of the solar heat source, it is calculated by the following formula (5).

$$Qin = (Qsun - Qsunloss) = Qsun' \qquad (5)$$

Herein, as described above, Qcp' is the total energy amount leaked from the nonadiabatic pressure pump 16-7 and the pipe arrangement system coupled to the nonadiabatic pressure pump 16-7. However, Qcp' includes the energy amount finally captured by the multilayer warm-keeping storage tank 9 and the energy amount recovered and captured as warm water stored in the medium-temperature water tank 8 and the high-temperature heat storage tank 10. Therefore, in the following description, Qcp' will be replaced by Qesc from the relationship indicated in the following formula (6).

$$Qesc \approx Qcp' \qquad (6)$$

Also, in the superheated steam generator, the condition of continuously generating the superheated steam is calculated by the following formula (7).

$$Qesc + Qz' = Qin + \alpha \qquad (7)$$

Herein, Qesc denotes a heat loss due to a machine loss, that is, the energy amount recovered to HTW and MTW in the end by the multilayer warm-keeping storage tank 9 having a three-layer structure, whereas α denotes a part of the energy amount with the seawater source. In addition, when α<=Qin and Qin=0, that is, the recovered energy is flown back to the solar heat storage multilayer warm-keeping tank 6 in the state where there is little energy with the solar heat source such as night time of cloudy day, thereby allowing continuous power generation.

Furthermore, when the above formula (7) is used for Qesc, Qesc is calculated as shown in the following formula (8).

$$Qesc = Qin + \alpha - Qz' \qquad (8)$$

Then, the formula (8) is substituted into the above formula (2), Qz' is deleted, and then the following formula (9) is obtained.

$$Qws + Qzo = Qz + Qin + \alpha - Qesc \qquad (9)$$

Accordingly, Qws is calculated by the following formula (10).

$$Qws = Qz - Qzo + Qin + \alpha - Qesc \qquad (10)$$

Moreover, from the relationship between the formula (6) and the formula (7), Qcp' is calculated by the following formula (11).

$$Qcp' \approx Qesc = Qin + \alpha - Qz' \qquad (11)$$

Herein, when the relationship between Qcp' and Qesc is defined as Qcp'=Qesc and Qcp' and Qesc are substituted into the above formula (1), Qout is calculated by the following formula (12).

$$Qout = Qin + Qz - Qzo - [Qin + \alpha - Qz'] - Qloss = Qz - Qzo - \alpha + Qz' - Qloss \qquad (12)$$

When the above formula (2) is transformed, the following formula (13) is satisfied.

$$Qz' = Qws - (Qz - Qzo) \qquad (13)$$

Then, when the formula (13) is substituted into the formula (12) and Qz' is deleted, the following formula (14) is satisfied.

$$Qout = Qz - Qzo - \alpha + Qws - Qz + Qzo - Qloss = Qws - \alpha - Qloss \qquad (14)$$

Accordingly, the energy output from the superheated steam generator as Qout is defined as the above formula (14). Then, when α is deleted from the formula (14) with the use of the formula (11), the following formula (15) is satisfied.

$$-\alpha = Qin - Qesc - Qz' \qquad (15)$$

Then, when the formula (15) is substituted into the formula (14), the following formula (16) is satisfied, $$Qout = Qws + Qin - (Qesc + Qz') - Qloss \qquad (16)$$

Herein, Qout denotes the entire system output, Qws denotes the energy amount of the seawater source, Qin denotes the energy amount of the solar heat source, Qesc is a heat loss due to a machine loss. As described above, this machine loss includes the loss recovered by the coolant water and the loss recovered by the multilayered tank system (the solar heat storage multilayer warm-keeping tank 6, the multilayer warm-keeping storage tank 9). In addition, Qz' denotes the recovered energy and is approximately 60 to 70% of Qws. Furthermore, Qz' is stored in the system of the superheated steam generator, and is not included in Qout. Moreover, Qloss denotes the loss amount in the electric system that is not recoverable.

As described above, in the formula (16), since the energy of (Qesc+Qz') is stored in the system and cannot be output to the exterior as Qout (the entire system output), it is defined as phase energy. In other words, in the superheated steam generator according to the present invention, the energy Qout (the entire system output) that can be actually output as an energy utilization source of the vapor turbine or the like is stored in the superheated steam generator, from the sum of Qws that is the seawater source energy and the solar source energy Qin. The energy balance according to the present invention is made obtainable from the output in which the phase energy that is not output to the exterior as Qout and an inevitable heat loss Qloss are subtracted from Qout. Incidentally, when the phase energy is defined as "i" and the formula (16) is rewritten with the phase energy Ephase=Qsec+Qz', the following formula (17) is satisfied.

$$Qout = Qws + Qin - Qloss - i \times Ephase \qquad (17)$$

That is to say, the output of the superheated generator has a complex expression, and an effective output is a scalar quantity of an actual number. However, retained in the superheated steam generator are an imaginary axis component and a phase component. This phase component is considered to change its phase to become energy of a real number, while passing though the cooling system and being taken into the warm-keeping system such as HTW. Generally, the properties of various devices of thermal dynamics should be complex vectors, so the electromagnetism should be considered absolutely necessary in a similar manner. This is because the superheated steam generator according to the present invention is capable of recovering the heat energy that has conventionally been dissipated can be recovered in the multilayered tank system (the solar heat storage multilayer warm-keeping tank 6, the multilayer warm-keeping storage tank 9) and the cooling system so as to store heat.

Therefore, as described above, $^{11}/_{12}$ of the energy Qout is estimated to be seawater source energy. For this reason, even if the solar source energy Qin is 0, the superheated steam generator according to the present invention is capable of supplying energy in a stable manner to the energy utilization source such as a vapor turbine or the like, without deteriorating the efficiency drastically.

The following is provided as an example. In a case where the superheated steam generator according to the present invention is mounted in a power generating ship for power generation by means of the superheated steam on the sea, when the size of the power generating ship is considered, the size of the power generating ship and its power production amount are calculated as follows. If it is assumed that the entire system output of the superheated steam generator according to the present invention mounted in a power generating ship has 10 MW output/ship and the power generating ship is as big as an oil supertanker, the estimation results in the provision of 18,000 oil supertankers on the sea.

Thus, the available power generation amount is capable of covering 175,767 MW, which is the total output of thermal power generation in all over Japan in 2005 (H17) (and which is 64% of the entire power generation mount). Incidentally, this power generation amount is calculated by reference to data of Ministry of Internal Affairs and Communications, Statistics Bureau (Heisei 20, The $57^{th}$ Japan Yearly Statistics, p 345, published in November 2007).

In this application, the number of heliostats (see FIG. 1 and FIG. 3) for collecting lights of the solar heat source energy is approximately 950, in calculation with the deck board area 76.000 m$^2$ (equivalent diameter is 310 meters in the circle diameter conversion) in which the heliostat is arranged. Additionally, the displacement for a single power generating ship is estimated to be approximately one million tons of water including a doughnut-shaped submergence levitation body.

There is provided a superheated steam generator capable of generating, without using a fossil fuel, the superheated steam that is a utilization source of a vapor turbine type of power generator from a solar heat source energy and water temperature energy of seawater or the like with less environmental burden.

While the invention has been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A superheated steam generator for generating superheated steam, comprising:
   zeolite;
   a water supply device configured to supply mist-state moisture to the zeolite, wherein the zeolite adsorbs mist-state moisture to heat the zeolite;
   a zeolite boiler system having a desorption heater for desorbing water molecules adsorbed onto the zeolite and for heating the zeolite to generate the superheated steam;
   a low-temperature purified water tank for storing purified water subject to heat exchange with at least one of seawater and surface water, the low-temperature purified water tank configured to supply the purified water subsequent to the heat exchange to the water supply device; and
   an atomization device for generating the purified water applied to the water supply device as the mist-state moisture.

2. The superheated steam generator according to claim 1, wherein the atomization device causes a temperature of the purified water to be supplied to the water supply device from the low-temperature purified water tank to be lower than a temperature of water subject to the heat exchange with the purified water stored in the low-temperature purified water tank, by means of latent heat phenomena in the course of a vaporization process produced when the mist-state moisture is generated.

3. The superheated steam generator according to claim 1, further comprising:
   a nonadiabatic pressure pump for compressing the superheated steam produced by the zeolite boiler system to generate high-temperature and high-pressure superheated steam higher in temperature and pressure than the superheated steam produced by the zeolite boiler system; and
   a high-temperature and high-pressure superheated steam tank for storing the high-temperature and high-pressure superheated steam generated by the nonadiabatic pressure pump and outputting the stored high-temperature and high-pressure superheated steam to a steam turbine power generator.

4. The superheated steam generator according to claim 3, wherein the high-temperature and high-pressure superheated steam tank comprises:
   a high-temperature and high-pressure superheated steam stock for stocking the high-temperature and high-pressure superheated steam; and
   a circulating passage for recovering heat energy leaked from the high-temperature and high-pressure superheated steam stock.

5. The superheated steam generator according to claim 1, further comprising:
   a high-temperature water stock for stocking high-temperature water produced by solar heat source energy; and
   a solar heat storage warm-keeping tank provided around the high-temperature water stock,
   wherein the solar heat storage warm-keeping tank includes a medium-temperature water layer for recovering heat energy leakage from the high-temperature water stock.

6. The superheated steam generator according to claim 5, wherein the zeolite boiler system comprises:
   a plurality of furnace bodies, some of the furnace bodies constituting a first furnace body line in which multiple furnace bodies are connected by a pipe arrangement, the others of the furnace bodies that do not constitute the first furnace body line constituting a second furnace body line in which multiple furnace bodies are connected by a pipe arrangement; and
   a reaction switching control device for alternately switching between the first furnace body line and the second furnace body line to an adsorbing furnace body line in which the moisture is adsorbed onto the zeolite by the water supply device and a desorbing furnace body line in which the moisture in the zeolite is desorbed by a desorption heater.

7. An electric power generating ship comprising the superheated steam generator according to claim 6, and installed on the water for heat exchange with the purified water stored in the low-temperature purified water tank,
   wherein the superheated steam is generated while the solar heat source energy is being taken into the desorption heater and seawater source energy is being taken into the low-temperature purified water tank.

8. The electric power generating ship according to claim 7, wherein the low-temperature purified water tank is arranged at a position lower than a surface of water subject to the heat exchange with the purified water stored in the low-temperature purified water tank to be in contact with the water subject to the heat exchange with the purified water stored in the low-temperature purified water tank.

9. The electric power generating ship according to claim 7 further comprising:
   a connection robot comprising a remote control arm for connecting an in-water power cable of the electric power generating ship arranged in the water subject to the heat exchange with the purified water stored in the low-temperature purified water tank to a terminal of an in-water installed power cable.

\* \* \* \* \*